(12) United States Patent
Albertson et al.

(10) Patent No.: US 7,840,031 B2
(45) Date of Patent: Nov. 23, 2010

(54) TRACKING A RANGE OF BODY MOVEMENT BASED ON 3D CAPTURED IMAGE STREAMS OF A USER

(75) Inventors: Jacob C. Albertson, Newton, MA (US); Kenneth C. Arnold, Ellicott City, MD (US); Steven D. Goldman, Chesterfield, MO (US); Michael A. Paolini, Austin, TX (US); Anthony J. Sessa, Quogue, NY (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 11/622,685

(22) Filed: Jan. 12, 2007

(65) Prior Publication Data

US 2008/0170123 A1    Jul. 17, 2008

(51) Int. Cl.
  *G06K 9/00* (2006.01)
(52) U.S. Cl. .................. 382/103; 382/107; 382/154
(58) Field of Classification Search .................. 382/103
  See application file for complete search history.

(56) References Cited

U.S. PATENT DOCUMENTS

| | | | |
|---|---|---|---|
| 5,103,305 A | * | 4/1992 | Watanabe .................. 382/236 |
| 5,109,425 A | * | 4/1992 | Lawton .................... 382/107 |
| 5,454,043 A | | 9/1995 | Freeman |
| 5,502,803 A | | 3/1996 | Yoshida et al. |
| 5,581,276 A | | 12/1996 | Cipolla et al. |
| 5,691,693 A | | 11/1997 | Kithil |
| 5,714,698 A | | 2/1998 | Tokioka et al. |
| 5,777,720 A | | 7/1998 | Shapiro et al. |
| 5,880,731 A | | 3/1999 | Liles et al. |

(Continued)

FOREIGN PATENT DOCUMENTS

CN    1655197 A    8/2005

(Continued)

OTHER PUBLICATIONS

USPTO Notice of Allowance, Dated Dec. 14, 2009, In RE Albertson (U.S. Appl. No. 11/470,421, filed Sep. 6, 2006), pp. 1-13.

(Continued)

*Primary Examiner*—Bhavesh M Mehta
*Assistant Examiner*—David P Rashid
(74) *Attorney, Agent, or Firm*—David A. Mims, Jr.; Amy J. Pattillo

(57) ABSTRACT

A computer-implemented method, system, and program product includes a movement processing system for capturing a first three-dimensional movement of a user and capturing at least another three-dimensional movement of the user, wherein the three-dimensional movement is determined using at the at least one image capture device aimed at the body of the user. A projected movement system predicts a movement baseline based on the first three-dimensional movement of the user and predicts at least one subsequent movement range based on the at least another three-dimensional movement of the user. Based on a comparison of the movement baseline with the at least one subsequent movement, the projected movement systems predicts a projected movement of a user for tracking changes in a range of body movement of a user.

17 Claims, 7 Drawing Sheets

U.S. PATENT DOCUMENTS

| | | | |
|---|---|---|---|
| 5,930,378 A * | 7/1999 | Kubota et al. | 382/107 |
| 6,002,808 A | 12/1999 | Freeman | |
| 6,049,747 A | 4/2000 | Nakajima et al. | |
| 6,072,494 A | 6/2000 | Nguyen | |
| 6,115,053 A | 9/2000 | Perlin | |
| 6,154,558 A * | 11/2000 | Hsieh | 382/103 |
| 6,181,343 B1 | 1/2001 | Lyons | |
| 6,215,890 B1 | 4/2001 | Matsuo et al. | |
| 6,295,367 B1 * | 9/2001 | Crabtree et al. | 382/103 |
| 6,301,370 B1 * | 10/2001 | Steffens et al. | 382/103 |
| 6,421,453 B1 | 7/2002 | Kanevsky | |
| 6,577,937 B1 | 6/2003 | Shuman | |
| 6,674,877 B1 * | 1/2004 | Jojic et al. | 382/103 |
| 6,766,036 B1 | 7/2004 | Pryor | |
| 6,784,901 B1 | 8/2004 | Harvey et al. | |
| 6,788,809 B1 | 9/2004 | Grzeszczuk et al. | |
| 6,859,144 B2 | 2/2005 | Newman et al. | |
| 7,039,676 B1 | 5/2006 | Day et al. | |
| 7,058,204 B2 | 6/2006 | MacDougall et al. | |
| 7,068,843 B2 | 6/2006 | Chang et al. | |
| 7,224,830 B2 | 5/2007 | Nefian et al. | |
| 7,274,800 B2 | 9/2007 | Nefian et al. | |
| 2002/0004629 A1 | 1/2002 | Natori | |
| 2002/0118880 A1 | 8/2002 | Liu | |
| 2002/0152010 A1 | 10/2002 | Colmenarez | |
| 2003/0058111 A1 | 3/2003 | Lee et al. | |
| 2003/0076300 A1 | 4/2003 | Lauper | |
| 2003/0113018 A1 | 6/2003 | Nefian | |
| 2003/0142068 A1 | 7/2003 | DeLuca | |
| 2003/0156756 A1 | 8/2003 | Gortuk | |
| 2003/0227453 A1 | 12/2003 | Beier et al. | |
| 2004/0032970 A1 * | 2/2004 | Kiraly | 382/103 |
| 2004/0161132 A1 * | 8/2004 | Cohen et al. | 382/103 |
| 2004/0228503 A1 * | 11/2004 | Cutler | 382/103 |
| 2005/0030184 A1 | 2/2005 | Victor | |
| 2005/0069852 A1 | 3/2005 | Janakiraman et al. | |
| 2005/0166163 A1 | 7/2005 | Chang | |
| 2005/0206610 A1 | 9/2005 | Cordeli | |
| 2005/0210419 A1 | 9/2005 | Kela et al. | |
| 2006/0013440 A1 | 1/2006 | Cohen | |
| 2006/0067573 A1 | 3/2006 | Parr et al. | |
| 2006/0097857 A1 | 5/2006 | Osaka et al. | |
| 2006/0098737 A1 | 5/2006 | Sethuraman et al. | |
| 2006/0181518 A1 | 8/2006 | Shen et al. | |
| 2006/0181519 A1 | 8/2006 | Vernier et al. | |
| 2006/0210112 A1 | 9/2006 | Cohen et al. | |
| 2007/0041058 A1 | 2/2007 | Disatnik et al. | |
| 2007/0063855 A1 | 3/2007 | Maass | |
| 2008/0022365 A1 | 1/2008 | Chae et al. | |
| 2008/0040692 A1 | 2/2008 | Sunday et al. | |
| 2008/0068187 A1 | 3/2008 | Bonefas et al. | |
| 2008/0143895 A1 | 6/2008 | Peterka et al. | |
| 2009/0274339 A9 | 11/2009 | Cohen et al. | |
| 2010/0169792 A1 | 7/2010 | Ascar et al. | |

FOREIGN PATENT DOCUMENTS

| | | |
|---|---|---|
| EP | 0905644A A | 3/1999 |
| EP | 0991011 A | 4/2000 |
| EP | 1723901 A | 11/2006 |
| EP | 1723901 A1 | 11/2006 |
| FR | 2784887 A | 4/2000 |
| WO | 0002187 A | 1/2000 |
| WO | 2004108466 A | 12/2004 |

OTHER PUBLICATIONS

USPTO Office Action, Dated Jan. 15, 2010, In RE Albertson (U.S. Appl. No. 11/622,684, filed Jan. 12, 2007), pp. 1-24.

USPTO Office Action, Dated Jan. 14, 2010, In RE Albertson (U.S. Appl. No. 11/622,693, filed Jan. 12, 2007), pp. 1-23.

USPTO Office Action, Dated Jun. 25, 2009, In RE Albertson (U.S. Appl. No. 11/470,421, filed Sep. 6, 2006), pp. 1-20.

Alan Yuille, "Computer Vision Systems for the Blind and Visually Disabled", UCLA Dept. Statistics and Psychology, 4 pages, [online], [print accessed on Aug. 18, 2006]. Retrieved from the internet < www.stat.ucla.edu/~yuille/courses/FIAT_Stat19/fiat3.ppt>.

"What is Photosynth", Microsoft Live Labs, copyright Microsoft Corporation 2006, 1 page, [online], [print accessed on Aug. 18, 2006]. Retrieved from the internet <http://labs.live.com/photosynth/whatis/>.

"What is Synthetic Aperture Radar", 3 pages, copyright 2005, Sandia Corporation, [online], [print accessed on Aug. 18, 2006]. Retrieved from the Internet <http://www.sandia.gov/RADAR/whatis.html>.

"Accelerometer", 3 pages, copyright Wikipedia, [online], [print accessed on Oct. 31, 2006], [last modified on Oct. 24, 2006]. Retrieved from the internet <http://en.wikipedia.org/wiki/Accelerometer>.

Eric Lipton, "Faces, Too are Searched as U.S. Airports Try to Spot Terrorists", 1 page, The New York Times, Aug. 17, 2006.

"Method for Access Control Via Gesural Verification", IBM Technical Disclosure Bulletin, IBM Corp, New York, US, vol. 36, No. 9B, Sep. 1, 1993, pp. 487-488, 2 pages.

Black, MJ et al, "Recognizing Temporal Trajectories Using the Condensation Algorithm", Automatic Face and Gesture Recognition, 1998, Proceedings from the Third IEEE International Conference on Nara, Japan, Apr. 1998, Los Alamitos CA, USA, IEEE Comuting Society, pp. 16-21, 6 pages.

Jacob C Albertson et al, "Warning A User About Adverse Behaviors of Others Within an Environment Based on a 3D Captured Image Stream", U.S. Appl. No. 11/622,676, filed Jan. 12, 2007.

Jacob C Albertson et al, "Adjusting A Consumer Experience Based on a 3D Captured Image Stream of a Consumer Response", U.S. Appl. No. 11/622,679, filed Jan. 12, 2007.

Jacob C Albertson et al, "Warning a Vehicle Operator of Unsafe Operation Behavior Based on a 3D Captured Image Stream", U.S. Appl. No. 11/622,684, filed Jan. 12, 2007.

Jacob C Albertson et al, "Controllling Resource Access Based on User Gesturing in a 3D Captured Image Stream of the User", U.S. Appl. No. 11/622,687, filed Jan. 12, 2007.

Jacob C Albertson et al, "Controlling a Document Based on User Behavioral Signals Detected from a 3D Captured Image Stream", U.S. Appl. No. 11/622,690, filed Jan. 12, 2007.

Jacob C Albertson et al, "Controlling a System Based on User Behavioral Signals Detected from a 3D Captured Image Stream", U.S. Appl. No. 11/622,693, filed Jan. 12, 2007.

Jacob C Albertson et al, "Assisting a Vision-Impaired User with Navigation Based on a 3D Captured Image Stream", U.S. Appl. No. 11/622,696, filed Jan. 12, 2007.

Jacob C Albertson et al, "Informing a User of Gestures Made by Others Out of the User's Line of Sight", U.S. Appl. No. 11/470,421, filed Sep. 6, 2006.

USPTO Office Action, Dated Mar. 22, 2010, In RE Albertson (U.S. Appl. No. 11/622,690, filed Jan. 12, 2007), 30 Pages.

USPTO Notice of Allowance, Dated Apr. 23, 2010, In RE Albertson (U.S. Appl. No. 11/622,693, filed Jan. 12, 2007), pp. 1-14.

USPTO Notice of Allowance, Dated May 3, 2010, In RE Albertson (U.S. Appl. No. 11/622,684, filed Jan. 12, 2007), pp. 1-37.

Albertson et al, Office Action, U.S. Appl. No. 11/622,687, filed Jan. 12, 2007, dated Aug. 16, 2010, 32 pages.

* cited by examiner

US 7,840,031 B2

TRACKING A RANGE OF BODY MOVEMENT BASED ON 3D CAPTURED IMAGE STREAMS OF A USER

TECHNICAL FIELD

The present invention relates in general to providing improved 3D body movement tracking. In particular, the present invention relates to predicting, from three-dimensional image streams of user movement over time, captured by one or more image capture devices, a projected movement by the user.

DESCRIPTION OF THE RELATED ART

Exercise is a part of many people's daily or weekly routines. Whether for improving fitness, rehabilitating from an injury, playing a sport, or exercising to meet set goals, as a person exercises, there are many ways in which a person may improve strength and range of motion, but there are also many ways in which a person may be injured or experience setbacks in improving a range of motion. Even with a trainer or physical therapist monitoring a person's movement, injuries may still occur.

Therefore, in view of the foregoing, there is a need for a computer-implemented method, system, and program product for monitoring user movement in three dimensions at a first point in time, monitoring additional selections of user movement in three dimensions at other points in time, and automatically predicting from the first set of user movement and the other selections of user movement, a projected change in movement or capacity for movement to aid a user in avoiding injury, rehabilitating from injury, or meeting fitness goals.

SUMMARY OF THE INVENTION

The invention provides tracking of a range of body movement of a person. The invention provides for predicting, from three-dimensional image streams of user movement over time, captured by one or more image capture devices, a projected movement by the user.

In one embodiment, a computer-implemented method, system, and program product comprises a movement processing system for capturing a first three-dimensional movement of a user, wherein the three-dimensional movement is determined using at least one image capture device aimed at the body of the user and capturing at least another three-dimensional movement of the user, wherein the at least one another three-dimensional movement is determined using at the at least one image capture device aimed at the body of the user. A projected movement system predicts a movement baseline based on the first three-dimensional movement of the user and predicts at least one subsequent movement range based on the at least another three-dimensional movement of the user. Based on a comparison of the movement baseline with the at least one subsequent movement, the projected movement systems predicts a projected movement of a user, from which adjustments may be recommended to aid a user in avoiding injury, rehabilitating from an injury, or properly using exercise equipment, from which a user may track fitness progress, and from which other output signals are generated and output to users, monitoring agents, and medical personnel.

The movement processing system captures three-dimensional movement of the user using a stereoscopic image device to identify and track at least one particular type of three-dimensional movement of at least one body member of the user. Further, the movement processing system may identify, in the captured three-dimensional movement, at least one characteristic of body movement comprising a fine granularity of movement such as a facial expression, eye movement, muscle contraction, or change in skin surface characteristics.

The projected movement system predicts projected movement indicating a decline or increase in the range of body movement of the user from the movement baseline to the at least one subsequent movement range. In addition, the projected movement system predicts projected movement specifying a future predicted range of body movement of the user.

The projected movement system translates projected movement into at least one output signal for output to a user at an output device or other system or for output to a monitoring agent at another system. In addition, the projected movement system controls output of the output signals to selected output devices and systems.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
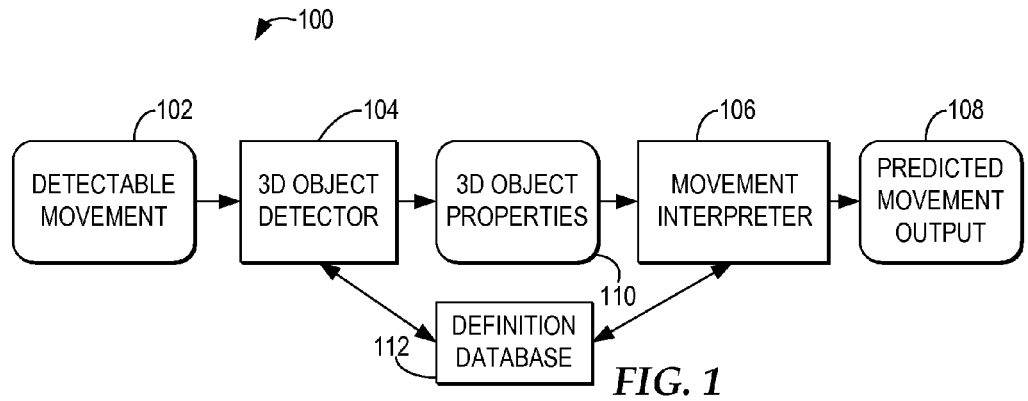
FIG. 1 is a block diagram illustrating a flow of information in a movement processing method, system, and program product.

With reference now to FIG. 1, a block diagram illustrates a flow of information in a movement processing method, system, and program product. It will be understood that FIG. 1 provides one embodiment of information flow for capturing image streams of the movement of a user and processing those image streams to predict movements of monitored users, including, but not limited detecting movement of one or more body parts, a range of motion, and other characteristics of movement by a user. In another embodiment, other information flows may be implemented to process captured data and predict movements by a user.

It is important to note that as used throughout, the term "movement" may include any type of movement of a body member, such as, but not limited to, an arm, leg, back, foot, hand, neck, or head, and may also include movement of clothing worn by a user, objects carried by a user, and replacement body parts. User movement may include fine granularity movements, such as gesturing and facial expressions, changes in muscle tone and contraction, including involuntary trembling, changes in body posture, eye movements, and changes in skin surface characteristics such as color, temperature, tone, and level of perspiration. In addition, user movement may include characteristics of user movement such as range of motion, speed, and strength.

In addition, it is important to note that as used throughout, the term "user" may refer to a monitored person, animal, or other moving entity within an exercise environment. A user or a monitoring agent may monitor user movement and projected movement, as will be further described, where a "monitoring agent" may refer to a person monitoring another user's movement, such as a trainer, or an automated system monitoring user movement. An "exercise environment" may include any environment in which a user is physically active in some way. Examples of exercise environments may include, but are not limited to, a sports arena, a practice venue, a gym, a track, and an outdoor area.

In the example, a movement processing system 100 includes a three-dimensional (3D) object detector 104. 3D object detector 104 represents multiple systems for capturing images and other data about moving and stationary objects, streamlining the captured data, tracking particular objects within the captured movement, streaming the properties of the particular objects, and combining the streamed properties into a three-dimensional representation of the 3D characteristics of the captured objects, as illustrated by 3D object properties 110. 3D object properties 110 may include, but are not limited to, positions, color, size, and orientation, representative of user movement.

In the example, 3D object detector 104 captures images within a focus area, represented as detectable movement 102. In addition, 3D object detector 104 may detect other types of data within a focus area. In particular, 3D object detector 104 detects detectable movement 102 through multiple types of image and data detection including, but not limited to, capturing video images, detecting movement of one or more particular body parts, detecting skin texture, detecting eye movement, detecting skin surface characteristics, and capturing thermal images. For supporting multiple types of image and data detection, 3D object detector 104 may include multiple types of image capture devices, including one or more video cameras arranged for stereoscope video image capture, and other types of sensors for capturing at least one other characteristic of one or more objects, such as thermal body imaging sensors, skin texture sensors, laser sensing devices, sound navigation and ranging (SONAR) devices, or synthetic laser or sonar systems. In particular, a sensor may be implemented using a separate sensor unit or may be implemented through a logic unit that operates on a captured image stream. For example, a logic unit may process the captured image stream to detect facial skin textures distinguishable from non-skin textures, such as a smooth wall or textured foliage, within a focus area.

Portions of detectable movement 102 may include images and other data representative of actual movement by a user and other portions of detectable movement 102 may include images and data not representative of movements. In one embodiment, 3D object detector 104 translates detectable movement 102 into a stream of 3D properties of detected objects and passes the stream of 3D object properties 110 to movement interpreter 106. Movement interpreter 106 determines which streams of 3D object properties 110 map into one or more user movements predicts the types of user movements from the streams of 3D object properties 110, detects characteristics of the user movements from the streams of 3D object properties 110, and calculates the probability that the actual movement in detectable movement 102 is correctly predicted by movement interpreter 106. In another embodiment, 3D object detector 104 may filter out 3D properties of detected objects that are not representative of user movement.

Movement interpreter 106 outputs each predicted type of user movement with characteristics and the percentage probability that the movement is correctly predicted as predicted movement output 108. Movement interpreter 106 may pass predicted movement output 108 to one or more movement-enabled applications at one or more systems. In one example, as will be further described, according to an advantage of the present invention, movement interpreter 106 passes predicted movement output 108 to a projected movement system that tracks a baseline movement for a user, accesses a range of additional movements of the user, and predicts a projected movement of the user. In addition, however, movement interpreter 106 may pass predicted movement output 108 to one or more other types of movement-enabled applications that interpret the predicted movements.

In particular, in processing detectable movement 102 and generating predicted movement output 108, 3D object detector 104 and movement interpreter 106 may access a definition database 112 of previously accumulated and stored movement definitions to better track and detect, within 3D object properties 110, those monitored objects representative of movements by a user and to better predict a type of movement and characteristics of the movement.

Further, in processing detectable movement 102 and generating predicted movement output 108, 3D object detector 104 and movement interpreter 106 attempt to identify objects representative of movements by a particular user and predict the type of movement and characteristics of the movement in view of the overall interaction in which the movement is made. Thus, 3D object detector 104 and movement interpreter 106 attempt to determine not just a movement, but a level of emphasis included in a movement that would effect the type and characteristics of the movement, a background of a user making a movement that would effect the type and characteristics of the movement, the environment in which the user makes the movement that would effect the type and characteristics of the movement, combinations of movements made together that effect the type and characteristics of each movement and other detectable factors that effect the type and characteristics of a movement. In addition, definition database 112 may be trained to more accurately identify users, exercise equipment, types of movements, and other items that are most common in a particular monitored exercise environment.

In addition, in processing detectable movement 102, multiple separate systems of image capture devices and other sensors may each capture image and data about separate or overlapping focus areas from different angles. The separate systems of image capture devices and other sensors may be communicatively connected via a wireless or wired connection and may share captured images and data with one another, between 3D movement detectors or between movement interpreters, such that with the combination of data, movement interpreter 106 may interpret movements with greater accuracy.

Figure 2:
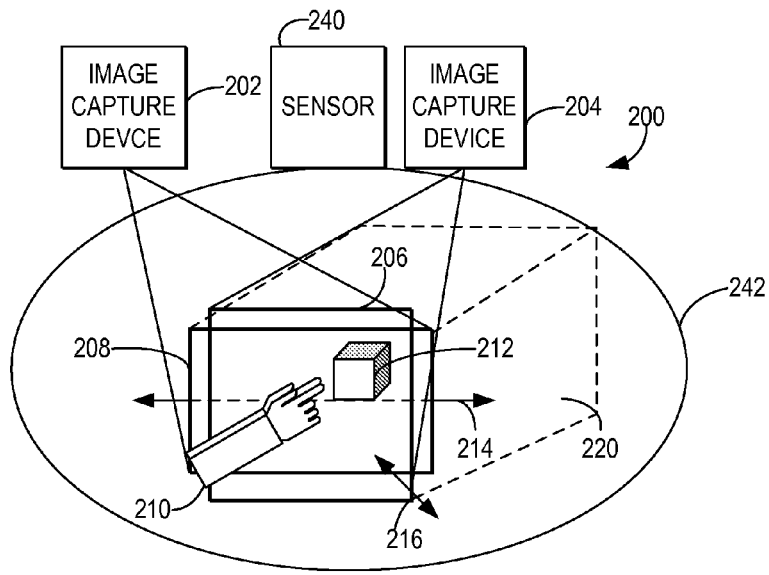
FIG. 2 is an illustrative block diagram depicting an example of an environment in which a 3D object detector captures and generates the 3D object properties representative of captured user movement.
Figure 10:
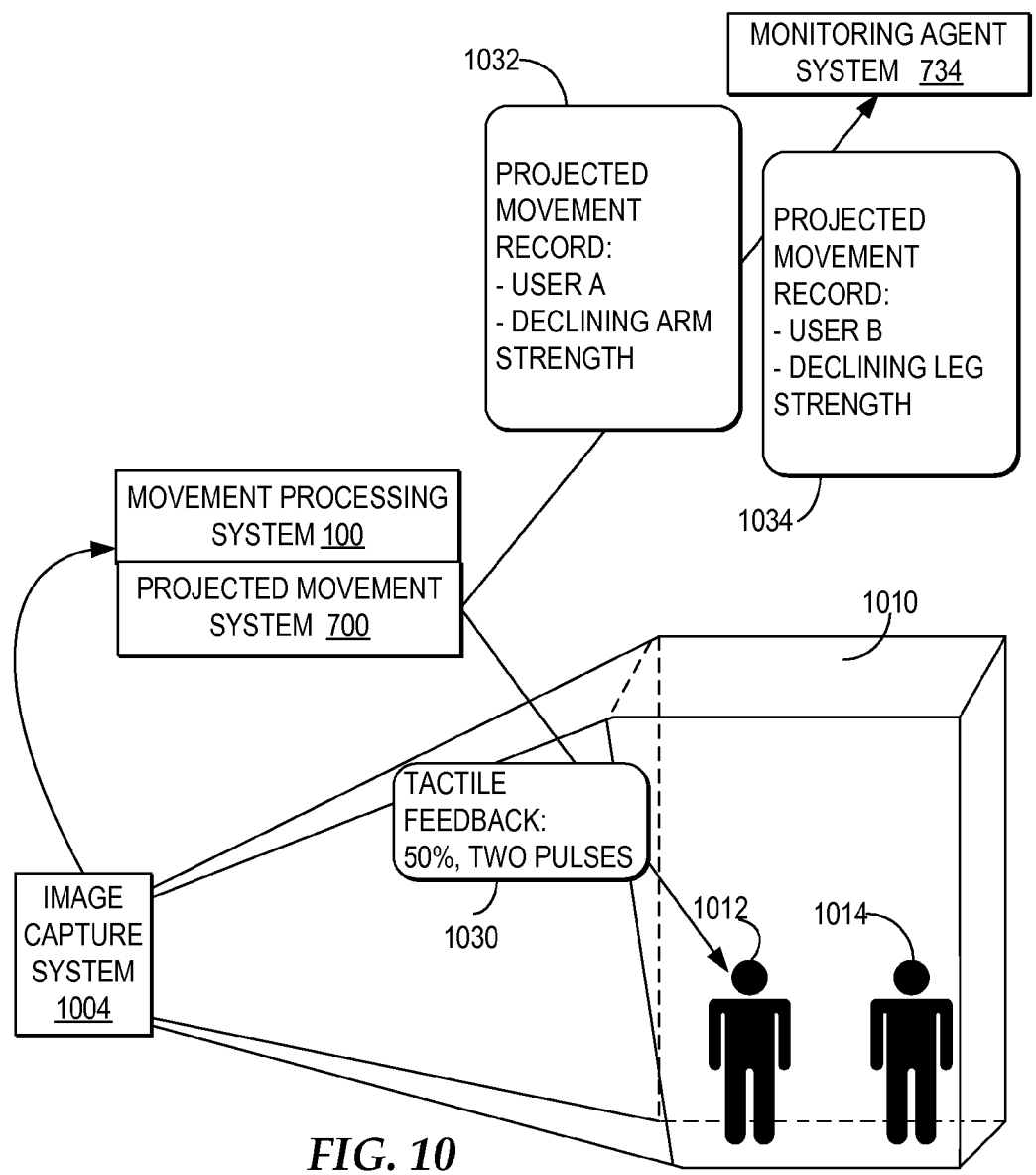
FIG. 10 is an illustrative diagram depicting an example of projected movement system concurrently monitoring and predicting projected movement of multiple users.

Referring now to FIG. 2, an illustrative diagram depicts an example of an environment in which a 3D object detector captures and generates the 3D object properties representative of captured user movement. It will be understood that detectable movement environment 200 is one example of an environment in which 3D object detector 104 detects images and data representative of detectable movement 102, as described with reference to movement processing system 100 in FIG. 1. More specifically, as will be further described, FIG. 10 illustrates an exercise environment in which the movement of multiple users is detected and processed.

In the example, detectable movement environment 200 includes a stereoscopic image device comprising an image capture device 202 and an image capture device 204, each positioned to detect movement of one or more objects representative of both user movement and non-user movement within a combined 3D focus area 220. In the depicted embodiment, image capture device 202 and image capture device 204 may each be positioned on one stationary axis or separate stationary axis, such that the area represented by 3D focus area 220 remains constantly focused upon. In addition, in the depicted embodiment, image capture device 202 and image capture device 204 and any other sensors may be positioned in parallel, at tangents, or at any other angles to control the span of and capture images within 3D focus area 220.

In another embodiment, image capture device 202 and image capture device 204 may each be positioned on a position adjustable axis or the actual focus point of image capture device 202 and image capture device 204 may be adjustable, such that the area represented by 3D focus area 220 may be repositioned. In one example, each of image capture device 202 and image capture device 204 may be coupled with one or more thermal imaging devices that detect thermal imaging based movement within a broad area and directs the repositioning of the focus area of each of image capture device 202 and image capture device 204 to track the thermal movement within the focus area of each camera.

In one example, image capture device 202 and image capture device 304 may be affixed to capture a particular 3D focus area 220 including, but not limited to, capturing all or portions of an exercise environment. In addition, in the present embodiment, image capture device 202 and image capture device 204 may be affixed to an apparatus that is carried by or worn by a user or a monitoring agent. For example, image capture device 202 and image capture device 204 may be affixed to a pair of glasses or other headwear worn by a monitoring agent such that 3D focus area 220 changes as the monitoring agent wearing the glasses moves.

Although not depicted, in another embodiment, only a single video camera, such as image capture device 202, may be implemented as a stereoscopic image device. The single video camera is placed on a track or other adjustable axis and a controller adjusts the position of the single video camera along the track, wherein the single video camera then captures a stream of video images within a focus area at different positioned points along the track and 3D movement detector 104 combines the stream of images into a 3D object property stream of the properties of detectable objects. In one example, the 3D object property stream can be generated from comparing the changes in luminance and shadowing across the frames as the camera changes in position. Alternatively, a stereoscopic image device may be implemented using a single fixed camera coupled with a sensor that detects depth. In addition, alternatively, a single camera enabled to process images and detect depth from a fixed position may function as a stereoscopic image device. For example, the single camera may process images and detect depth from detecting the movement of a light source and comparing changes in luminance and shadowing across the captured image frames. In particular, the single camera system may first map a model of a monitored face, focusing on the eyes, mouth, and nose and then detect changes in luminance and shadowing across image frames to detect depth characteristics of the face. In other examples, a system may process a captured stream of video images to extract depth from other characteristics of the stream of images.

For purposes of example, 3D focus area 220 includes a first capture plane 206, captured by image capture device 202 and a second capture plane 208, captured by image capture device 204. First capture plane 206 detects movement within the plane illustrated by reference numeral 214 and second capture plane 208 detects movement within the plane illustrated by reference numeral 216. Thus, for example, image capture device 202 detects movement of an object side to side or up and down and image capture device 204 detects movement of an object forward and backward within 3D focus area 220. It is important to note that when the movement of an object is tracked at a fine granularity, even small adjustments in user body movement such as a trembling muscle or furrowed eyebrows are tracked and can then be interpreted a type of user movement of a muscle movement with a characteristic specifying the degree of trembling or a facial expression with a characteristic specifying the intensity of the eyebrow furrow distinguished from a normal position of the eyebrows.

In the example, within 3D focus area 220, a hand 210 represents a moving object and a box 212 represents a stationary object. In the example, hand 210 is the portion of a user's hand within 3D focus area 220. A monitored user may make any number of movements of varying range of motion, speed, and strength in moving hand 210.

As a user moves hand 210 within 3D focus area 220, each of image capture device 202 and image capture device 204 capture a video stream of the movement of hand 210 within capture plane 206 and capture plane 208. From the video streams, 3D object detector 104 detects hand 210 as a moving object within 3D focus area 220 and generates a 3D property stream, representative of 3D object properties 110, of hand 210 over a period of time.

In addition, a user may move hand 210 in relation to box 212 or another object. For example, a user may point or make another type of movement directed to box 212. In another example, a user may lift box 212. As the user moves hand 210 within 3D focus area 220, the video streams captured by image capture device 202 and image capture device 204 include the movement of hand 210 and box 212. From the video streams, 3D object detector 104 detects hand 210 as a moving object and box 212 as a stationary object within 3D focus area 220, unless the user moves box 212, and generates 3D object property streams indicating the 3D properties of box 212 and the 3D properties of hand 210 in relation to box 212 over a period of time.

It is important to note that by capturing different planes of movement within 3D focus area 220 using multiple cameras, more points of movement are captured than would occur with a typical stationary single camera. By capturing more points of movement from more than one angle, 3D object detector 104 can more accurately detect and define a 3D representation of stationary objects and moving objects, including user movements, within 3D focus area 220. In addition, the more accurately that 3D object detector 104 defines a 3D representation of a moving object, the more accurately movement interpreter 106 can detect those objects representative of user movement and predict a types of characteristics of movement from the 3D model. For example, a movement could consist of a user making a motion directly towards or away from one of video camera 202 and video camera 204 which would not be able to be captured in a two dimensional frame; 3D movement detector 104 detects and defines a 3D representation of the movement as a moving object and movement interpreter 106 predicts the movement made by the movement towards or away from a video camera from the 3D model of the movement.

In addition, it is important to note that while FIG. 2 illustrates a moving hand 210 and a stationary box 212, in alternate embodiments, 3D focus area 220 may include multiple users, such that image capture device 202 and image capture device 204 capture images of the movement of multiple users, and 3D object detector 104 detects each movement by each user as a separate object. In particular, 3D object detector 104 may detect, from the captured video images from image capture device 202 and image capture device 204, movements with more motion, such as movements made with hands, and movements made with less motion, such as facial expressions, to accurately generate 3D object properties of a user's movements within an exercise environment.

In the example, in addition to capturing images within focus area 220, within detectable movement environment 200, other sensors may detect information relevant to an exercise environment, but outside of focus area 220. For example, sensor 240 may detect information within a sensor area 242. Sensor area 242 may overlap, be incorporated within, incorporate, or be separate from focus area 220. 3D object detector 104 combines the sensed information with captured images to more accurately generate 3D object properties 110 and to provide additional information about an environment to a warning system.

In one example, sensor 240 may perform facial recognition or other identification recognition from the captured image streams. In one example, sensor 240 may access a database of facial mappings for users and identify a particular user facial mapping matching a particular facial mapping from the database. In another example, sensor 240 may analyze the captured image stream for text that may identify a user. For example, sensor 240 may detect a badge number the captured image stream of a badge worn by a user. By sensor 240 detecting a user identity, object detector 104 may more accurately generate 3D object properties and movement interpreter 106 may more accurately predict types of user movement from definitions specified for the identified user in definition database 112.

Additionally, in another example, sensor 240 may supplement user recognition by detecting information broadcast from RFID chips placed on items within sensor area 242, where the RFID of an item broadcasts the item type, the item location, and any warning conditions associated with the item. For example, each user within an exercise environment, such as each player within a sports arena, may wear an RFID chip that broadcasts a unique identifier for each user. In another example, a piece of exercise equipment may include an RFID chip that broadcasts the type of exercise equipment and specifications for use of the exercise equipment. By combining sensed information about the location of a particular user or item with captured images from which the image is identified, object detector 104 may more accurately generate 3D object properties 110 and movement interpreter 106 may more accurately detect objects representative of user movement and predict the types of and characteristics of user movement from within 3D object properties 110. In addition, by sensor 240 accessing location information, movement interpreter 106 may include user identifying data with a movement record that enables a projected movement system to track and project movements of multiple users.

In yet another example, sensor 240 may focus on detecting particular types of objects, particular types of movements, or other specified types of data. For example, sensor 240 may focus on detecting and mapping particular body parts or particular types of body movements. In another example, sensor 240 may focus on detecting skin textures separate from non-skin based textures or on detecting changes in surface characteristics of skin. In particular, by focusing on particular types of objects, particular types of movements, or other specified data, data collected by sensor 240 is combined with images captured by image capture device 202 and image capture device 204 to generate additional detail and granularity in the mapping of a 3D image of an object and in the identification of the object.

It is important to note that movement processing system 100 may implement multiple sensors for detecting different types of data from a same or different sensor areas. In addition, it is important to note that sensor 240 and any other implemented sensors may independently collect and process data for a sensor area or may process the images captured by image capture device 202 and image capture device 204.

Figure 3:
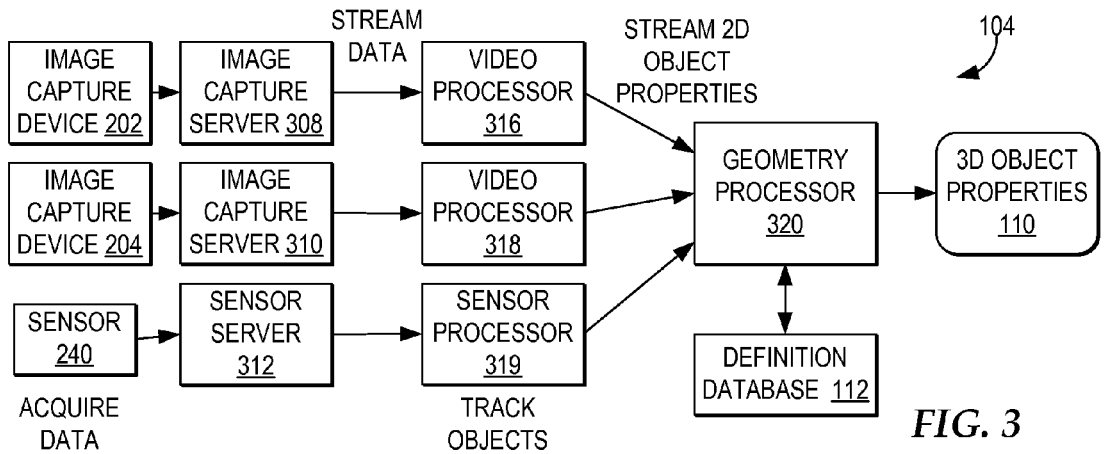
FIG. 3 is a block diagram illustrating one embodiment of a 3D object detector system for generating 3D object properties for enabling a movement interpreter to interpret, from 3D object properties, types and characteristics of user movement.

With reference now to FIG. 3, a block diagram illustrates one embodiment of a 3D object detector system for generating 3D object properties for enabling a movement interpreter to interpret, from 3D object properties, types and characteristics of user movement. It is important to note that the multiple components depicted within 3D object detector 104 may be incorporated within a single system or distributed via a network, other communication medium, or other transport medium across multiple systems. In addition, it is important to note that additional or alternate components from those illustrated may be implemented in 3D object detector 104 for capturing images and data and generating a stream of 3D object positions 110.

Initially, multiple image capture devices, such as image capture device 202, image capture device 204 and sensor 240, represent a stereoscopic image device or other image capture system for acquiring the data representative of detectable movement 102 within a 3D focus area and sensor area, such as 3D focus area 220 and sensor area 242. As previously described, image capture device 202 and image capture device 204 may represent video cameras for capturing video images. In addition, image capture device 202 and image capture device 204 may represent a camera or other still image capture device. In addition, image capture device 202 and image capture device 204 may represent other types of devices capable of capturing data representative of detectable movement 102. Image capture device 202 and image capture device 204 may be implemented using the same type of image capture system or different types of image capture systems. In addition, the scope, size, and location of the capture area and plane captured by each of image capture device 202 and image capture device 204 may vary.

Sensor 240 detects information about objects in a particular sensor area that enhances the ability of 3D object detector 104 to create 3D object properties 110. As previously described, sensor 240 may represent one or more different types of sensors, including, but not limited to, RFID readers, thermal body imaging sensors, skin texture sensors, laser sensing devices, sound navigation and ranging (SONAR) devices, or synthetic laser or sonar systems. In addition, sensor 240 may include sensors that detect a particular type of body part, a particular type of body movement, or textures indicative of skin separate from non-skin based textures.

Each of image capture device 202, image capture device 204, and sensor 240 transmit captured images and data to one or more computing systems enabled to initially receive and buffer the captured images and data. In the example, image capture device 202 transmits captured images to image capture server 308, image capture device 204 transmits captured images to image capture server 310, and sensor 240 transmits captured data to sensor server 312. Image capture server 308, image capture server 310, and sensor server 312 may be implemented within one or more server systems.

Each of image capture server 308, image capture server 310, and sensor server 312 streams the buffered images and data from image capture device 202, image capture device 204, and sensor device 240 to one or more processors. In the example, image capture server 308 streams images to a video processor 316, image capture server 310 streams images to a video processor 318, and sensor server 312 streams the sensed data to sensor processor 319. It is important to note that video processor 316, video processor 318, and sensor processor 319 may be implemented within one or more processors in one or more computer systems.

In one example, image capture server 308 and image capture server 310 each stream images to video processor 316 and video processor 318, respectively, where the images are streamed in frames. Each frame may include, but is not limited to, a camera identifier (ID) of the image capture device, a frame number, a time stamp and a pixel count.

Video processor 316, video processor 318, and sensor processor 319 are programmed to detect and track objects within image frames. In particular, because video processor 316, video processor 318, and sensor processor 319 receive streams of complex data and process the data to identify three-dimensional objects and characteristics of the three-dimensional objects, video processor 316, video processor 318, and sensor processor 319 may implement the Cell Broadband Engine (Cell BE) architecture (Cell Broadband Engine is a registered trademark of Sony Computer Entertainment, Inc.). The Cell BE architecture refers to a processor architecture which includes a base processor element, such as a Power Architecture-based control processor (PPE), connected to multiple additional processor elements also referred to as Synergetic Processing Elements (SPEs) and implementing a set of DMA commands for efficient communications between processor elements. In particular, SPEs may be designed to handle certain types of processing tasks more efficiently than others. For example, SPEs may be designed to more efficiently handle processing video streams to identify and map the points of moving objects, such as user body movements, within a stream of frames. In addition, video processor 316, video processor 318, and sensor processor 319 may implement other types of processor architecture that enables efficient processing of video images to identify, in three-dimensions, moving and stationary objects within video images from which movement of a user can be identified and the type and characteristics of the movement predicted.

In the example, video processor 316, video processor 318, and sensor processor 319 each create and stream the properties, including positions, color, size, shape, and orientation, of the detected objects to a geometry processor 320. In one example, each processed frame streamed to geometry processor 320 may include, but is not limited to, a camera ID, a frame number, a time stamp, and combinations of two or more of X axis coordinates (x_loc), Y axis coordinates (y_loc), and Z axis coordinates (z_loc). It is important to note that x_loc, y_loc, and z_loc may each include multiple sets of points and other data that identify all the properties of an object. If multiple objects are detected and tracked within a single frame, the X axis coordinates and Y axis coordinates for each object may be included in a single streamed object property record or in multiple separate streamed object property records. In addition, a streamed property frame, such as the frame from sensor processor 319 for a SONAR detected position, may include Z axis location coordinates, listed as z_loc, for example.

Geometry processor 320 receives the 2D streamed object properties from video processor 316 and video processor 318 and the other object data from sensor processor 319. Geometry processor 320 matches up the streamed 2D object properties and other data and constructs 3D object properties 110 from the streamed 2D object properties and other data. In particular, geometry processor 320 constructs 3D object properties 110 that include the depth of an object. In one example, each 3D object property record constructed by geometry processor 320 may include a time stamp, an object or user movement label, X axis coordinates (x_loc), Y axis coordinates (y_loc), and Z axis coordinates (z_loc), and additional information collected from sensors. For example, additional information collected from sensors may include a location or user identifier received from an RFID, At any of video processor 316, video processor 318, sensor processor 319, and geometry processor 320 property records may include at least one identifier to enable persistence in tracking the object. For example, the identifier may include a unique identifier for the object itself and an identifier of a class or type of object, including an object identified as user movement, and more specifically, a type of user movement.

In particular, by video processor 316, video processor 318, and sensor processor 319 identifying and classifying object properties, each of the processors may access definition database 112 for accessing previously processed inputs and movement mappings and item mappings to more accurately identify and classify 2D object properties to detect and match the streamed 2D object properties to an object. In addition, geometry processor 320 may more accurately construct 3D properties of objects based on the streamed 2D object properties, based on previously matched and constructed 3D properties of objects accessed from definition database 112. Further, object database 122 may store the streamed 2D object properties and 3D object properties for future reference.

In addition, by video processor 316, video processor 318, and sensor processor 319 identifying and classifying object properties and by geometry processor constructing 3D object properties 110, each of the processors may identify detected objects, including user movements. For example, video processor 316, video processors 318, sensor processor 319, and geometry processor 320 may access definition database 112, which includes specifications for use in mapping facial expressions and other body movements, performing facial and other body movement recognition, and performing additional processing to identify an object representing a movement. In addition, video processor 316, video processors 318, sensor processor 319, and geometry processor 320 may access definition database 112, which includes specifications for different types of environments for use in identifying a particular environment in which a user is located based on detected objects and background. Further, in constructing 3D object properties 110, video processor 316, video processors 318, sensor processor 319, and geometry processor 320 may identify other users or items in the environment and therefore identify movements of one user interacting with items and other users.

Figure 4:
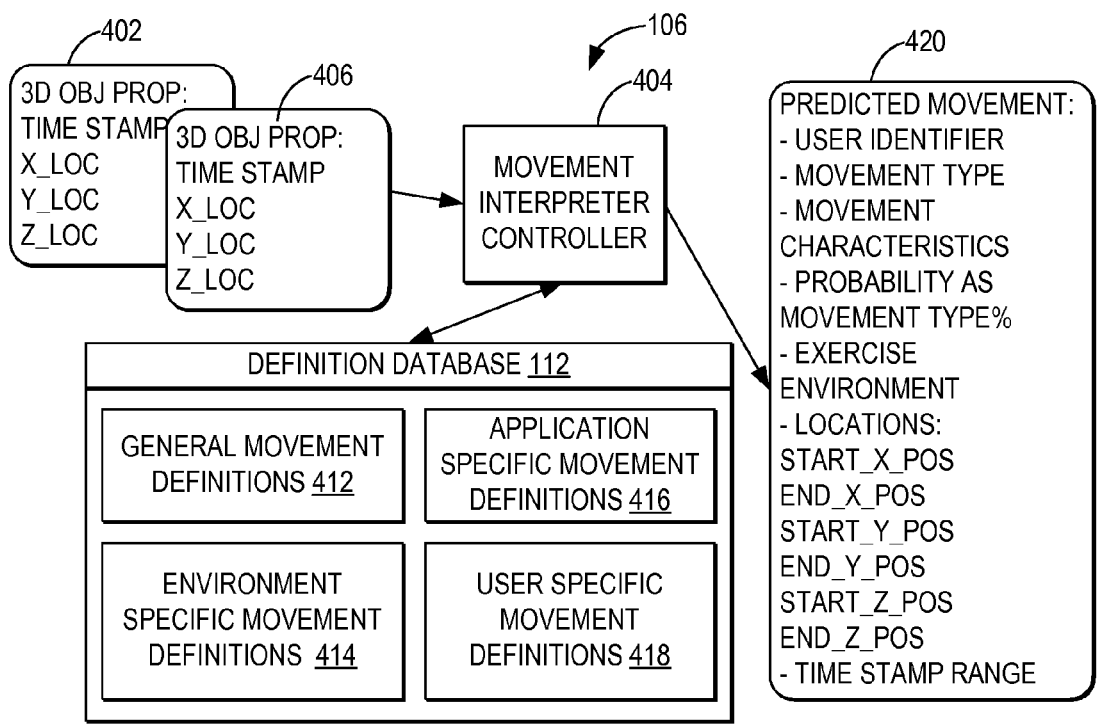
FIG. 4 is a block diagram depicting one embodiment of a movement interpreter system.

Referring now to FIG. 4, a block diagram illustrates one embodiment of a movement interpreter system. It is important to note that the multiple components depicted within movement interpreter 106 may be incorporated within a single system or distributed via a network across multiple systems. In the example, 3D properties records 402 and 406 include "time stamp", "x_loc", "y_loc", and "z_loc" data elements. It will be understood that 3D properties records 402 and 406 may include additional or alternate data elements as determined by geometry processor 320 of FIG. 3. For example, 3D properties record 402 may include additional information identifying a particular or relative location of a user, a particular body part, a particular movement, or other data collected by image capture devices and sensors within 3D object detector 104.

Movement interpreter 106 includes a movement interpreter controller 404, where movement interpreter controller 404 may include one or more processors programmed to perform movement interpretation. For example, movement interpreter controller 404 may include a processor with the CellBE architecture, programmed to efficiently process 3D object properties data streams, predict the movements of a user from the 3D object properties data streams and predict a type and characteristics of the user movement. In addition, movement interpreter controller 404 may include processors upon which software runs, where the software directs processing of 3D object properties streams, predicts the user movements from the 3D object properties data streams and predicts a type and characteristics of user movement.

In processing 3D object properties streams, such as the stream of 3D properties records 402 and 406, predicting objects related to or representing the user movement, and predicting the types of and characteristics of user movement, movement interpreter controller 404 maps 3D object properties to one or more movement definitions with a percentage probability that the streamed 3D object properties represent the mapped movement definitions and with a percentage probability that the predicted movement is correctly predicted. In particular, movement interpreter controller 404 accesses one or more movement definitions for one or more user movements and determines whether the 3D object properties match one or more characteristics of one or more movements as defined in one or more of the movement definitions. Movement definitions may include mapped 3D models of one or more types of user movements. In addition, movement definitions may define the parameters of identifying characteristics of a movement including, but not limited to, range of motion, surface characteristics, shape, speed of movement, strength of movement, frequency of movement, depth of movement, and temperature ranges.

In addition, in processing 3D object properties streams, movement interpreter controller 404 maps 3D object properties to one or more item definitions related to predicting a user movement, where an item may include an item worn by a user, an item carried by a user, exercise equipment, and other items within an exercise environment. In addition, item definitions may be integrated into movement definitions.

It is important to note that in interpreting 3D object properties streams, movement interpreter controller 404 performs an aggregate analysis of all the tracked objects in one or more 3D object properties streams identified for a particular focus area by one or more movement processing systems. In one example, movement interpreter controller 404 aggregates the 3D object property streams for a particular focus area and particular sensor area. In another example, movement interpreter controller 404 may receive multiple 3D object properties streams from areas overlapping a focus area and sensor area, analyze the 3D object properties streams for similarities, location indicators, and orientation indicators, and construct the 3D object properties streams into a 3D aggregate representation of an area.

In one embodiment, movement interpreter controller 404 may map the aggregate of the tracked objects directly into a single movement definition. In another embodiment, movement interpreter controller 404 maps multiple aggregated tracked objects into multiple movement definitions. For example, a user may simultaneously perform a facial movement while running, where in prediction of each of the types of movements and characteristics of the movements, movement interpreter controller 404 analyzes the 3D object properties of the facial movement in correlation with the 3D object properties of the movements associated with running and accesses movement definitions to enable prediction of each of the types of movements and to enable prediction of an overall type of movement indicated by the facial movement and running movements in combination. Additionally, movement interpreter controller 404 may aggregate the tracked objects representative of movement by multiple people within an environment.

In particular, in predicting movements for output to an operating monitoring system, the movement and item definitions within definition database 112 are specified to enable movement interpreter controller 404 to focus on and distinguish those movements which potentially relate to a user's physical abilities and changes in physical abilities. In the example, definition database 112 includes general movement definitions 412, environment specific definitions 414, application specific definitions 416, and user specific movement definitions 418. It will be understood that definition database 112 may include additional or alternate types of movement definitions and item definitions. In addition, it is important to note that each of the groupings of definitions illustrated in the example may reside in a single database or may be accessed from multiple database and data storage systems via a network. Further, it is important to note that each of the groupings of definitions within definitions database 112 residing at a particular system may be adjusted or updated responsive to changes in safety and injury prevention standards, new learned movements, and other factors.

General movement definitions 412 include movement definitions for common movements and factors for determining characteristics of common movements. For example, general movement definitions 412 may include movement definitions specifying a user running, walking, stretching or performing other movements typical in many different exercise environments. In addition, general movement definitions 412 specify, for each type of movement common among exercise environments, factors for determining a range of motion, speed, strength level, and other characteristics of the movement.

Environment specific definitions 414 include combinations of movement definitions, item definitions, and factors for determining a movement that are specific to the context in which the movement is being detected. Examples of contexts may include, but are not limited to, the specific type of exercise environment, the time of day, the skill level of a user within the exercise environment, and other factors that influence the context in which movement could be interpreted. A current exercise environment may include a general context, such as a gym or a sporting event, or a more specific context, such as a particular piece of equipment within a gym or a particular sport, including specifications of the size and type of field or arena that may effect user movement over a period of time. The item definitions for each exercise environment may specify the types of equipment, clothing, and other items that are common within the each specific exercise environment. Movement interpreter controller 404 may detect current context from accessing a GPS indicator identifying a location of a user, from detecting items within the image data indicative of particular types of exercise environments, or from receiving additional data from other systems monitoring an exercise environment In addition, a monitoring agent of a user may specify the current exercise environment through a user interface.

Application specific definitions 416 include movement and item definitions specific to the particular projected movement system or other movement-enabled system to which predicted movement records are output. In one example, for predicted movement records output to a projected movement system that processes predicted movement records, generates projected movement, and notifies a user or monitoring agent of projected movement, in real-time, application specific definitions 416 includes movement and item definitions specified for the types of movements in correlation with items which facilitate the projected movement system generating instructions for correcting a movement, such as use of equipment. In another example, for predicted movement records output to a projected movement system that tracks predicted movement records over times and enables a user or monitoring agent to periodically monitor statistical changes in the physical ability of a user after a training session is over, application specific definitions 416 includes movement and item definitions specified for the types of movements in correlation with items which facilitate the projected movement system generating instructions for projecting ability during a next training session.

User specific movement definitions 418 include movement definitions specific to the current monitored user or group of users by specifying definitions to user body types, previously detected movements, and other user characteristics. In one example, movement interpreter controller 404 accesses an identifier for a user from comparing an attribute of the user detected by 3D object detector 104, with a database of user attributes. For example, movement interpreter controller 404 may perform facial or voice recognition. In another example, through a user interface, a user or monitoring agent may specify identities for a user or group of users. Further, a user may carry an identification device which the user swipes or which includes an RFID or other wireless transmission media from which the identity of a user is detected. It will be understood that movement interpreter controller 404 may perform other types of identity access and authentication of a user for permitting a particular to user a piece of exercise equipment or enter an exercise environment based on the movement definitions specified for the user.

In particular, as will be further described with reference to FIG. 7, a projected movement system may establish a baseline movement profile for a user, including attributes such as a user's age, weight, height, diet, body mass, injury, or illness and the mappings from predicted movement records established for a particular user. The projected movement system may update user specific movement definitions 416 with the baseline movement profile and with additional movement mappings as gathered and interpreted by user specific movement definitions 416. In addition, a projected movement system predicts projected movement mappings which may be updated in user specific movement definitions 416 to enable movement interpreter controller 404 to more efficiently detect and predict types and characteristics of future movement by the user.

Further, within the available movement definitions, a movement definition may be associated with a particular area of movement or a particular depth of movement within a 3D focus area. In particular, the three-dimensional focus area in which movement is detected may be divided into three-dimensional portions, where movements made in each of the portions may be interpreted under different selections of movement definitions. For example, one three-dimensional portion of a focus area may be considered an "active region" where movement detected within the area is compared with a selection of movement definitions associated with that particular active region.

Movement interpreter controller 404 may output predicted movement output 108 in the form of one or more movement records, such as movement record 420. Movement record 420 indicates the "user identifier", "movement type", "movement characteristics", "probability % as the movement", exercise environment, and time range. In addition, movement record 420 includes the start X, Y, and Z axis properties and ending X, Y, and Z axis properties of the detected movement, indicative of the points mapped in determining the location, direction of movement, and speed of movement of the movement, listed as "start_x_pos", "end_x_pos", "start_y_pos", "end_y_pos", "start_z pos", "end_z pos". Further, movement record 420 may include additional information acquired from sensors, such as RFID data, GPS coordinates, skin surface characteristics, and other sensed data, may be associated with a particular movement record or included in a separate object record.

In passing movement record 420, movement interpreter controller 404 may filter out particular types of movement records. For example, movement interpreter controller 404 may not pass records where the predicted probability of a type of movement is less than a particular percentage.

Figure 5:
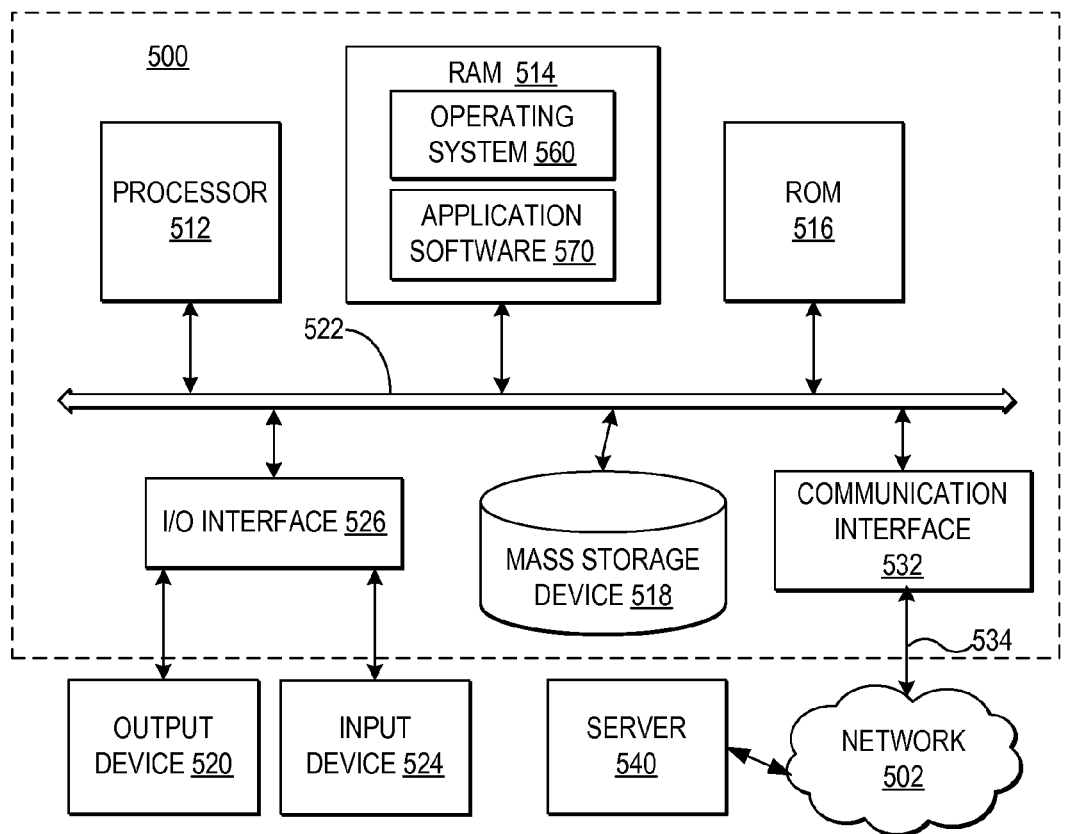
FIG. 5 is a block diagram illustrating one embodiment of a computing system in which the present invention may be implemented.

With reference now to FIG. 5, a block diagram depicts one embodiment of a computing system in which the present invention may be implemented. The controllers and systems of the present invention may be executed in a variety of systems, including a variety of computing systems, such as computer system 500, communicatively connected to a network, such as network 502.

Computer system 500 includes a bus 522 or other communication device for communicating information within computer system 500, and at least one processing device such as processor 512, coupled to bus 522 for processing information. Bus 522 preferably includes low-latency and higher latency paths that are connected by bridges and adapters and controlled within computer system 500 by multiple bus controllers. When implemented as a server, computer system 500 may include multiple processors designed to improve network servicing power. Where multiple processors share bus 522, an additional controller (not depicted) for managing bus access and locks may be implemented.

Processor 512 may be a general-purpose processor such as IBM's PowerPC™ processor that, during normal operation, processes data under the control of an operating system 560, application software 570, middleware (not depicted), and other code accessible from a dynamic storage device such as random access memory (RAM) 514, a static storage device such as Read Only Memory (ROM) 516, a data storage device, such as mass storage device 518, or other data storage medium. In one example, processor 512 may further implement the CellBE architecture to more efficiently process complex streams of data in 3D. It will be understood that processor 512 may implement other types of processor architectures. In addition, it is important to note that processor 512 may represent multiple processor chips connected locally or through a network and enabled to efficiently distribute processing tasks.

In one embodiment, the operations performed by processor 512 may control 3D movement detection and prediction from captured images and data within an exercise environment, prediction of types and characteristics of movement, establishing baseline profile of user movement, gathering addition user movement indicative of changes in physical ability, predicting projected movement of a user, and output of signals indicating the projected movement depicted in the operations of flowcharts of FIG. 11-14 and other operations described herein. Operations performed by processor 512 may be requested by operating system 560, application software 570, middleware or other code or the steps of the present invention might be performed by specific hardware components that contain hardwired logic for performing the steps, or by any combination of programmed computer components and custom hardware components.

The present invention may be provided as a computer program product, included on a computer or machine-readable medium having stored thereon the executable instructions of a computer-readable program that when executed on computer system 500 cause computer system 500 to perform a process according to the present invention. The terms "computer-readable medium" or "machine-readable medium" as used herein includes any medium that participates in providing instructions to processor 512 or other components of computer system 500 for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 500 can read and which is suitable for storing instructions. In the present embodiment, an example of a non-volatile medium is mass storage device 518 which as depicted is an internal component of computer system 500, but will be understood to also be provided by an external device. Volatile media include dynamic memory such as RAM 514. Transmission media include coaxial cables, copper wire or fiber optics, including the wires that comprise bus 522. Transmission media can also take the form of acoustic or light waves, such as those generated during radio frequency or infrared data communications.

Moreover, the present invention may be downloaded or distributed as a computer program product, wherein the computer-readable program instructions may be transmitted from a remote computer such as a server 540 to requesting computer system 500 by way of data signals embodied in a carrier wave or other propagation medium via network 502 to a network link 534 (e.g. a modem or network connection) to a communications interface 532 coupled to bus 522. In one example, where processor 512 includes multiple processor elements, then a processing task distributed among the processor elements, whether locally or via a network, may represent a computer program product, where the processing task includes program instructions for performing a process or program instructions for accessing Java (Java is a registered trademark of Sun Microsystems, Inc.) objects or other executables for performing a process. Communications interface 532 provides a two-way data communications coupling to network link 534 that may be connected, for example, to a local area network (LAN), wide area network (WAN), or directly to an Internet Service Provider (ISP). In particular, network link 534 may provide wired and/or wireless network communications to one or more networks, such as network 502. Further, although not depicted, communication interface 532 may include software, such as device drivers, hardware, such as adapters, and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

Network link 534 and network 502 both use electrical, electromagnetic, or optical signals that carry digital data streams. The signals through the various networks and the signals on network link 534 and through communication interface 532, which carry the digital data to and from computer system 500, may be forms of carrier waves transporting the information.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, a body scanning system, a keyboard, a mouse, or other input peripheral device, communicatively enabled on bus 522 via I/O interface 526 controlling inputs. In addition, for example, an output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figure 6:
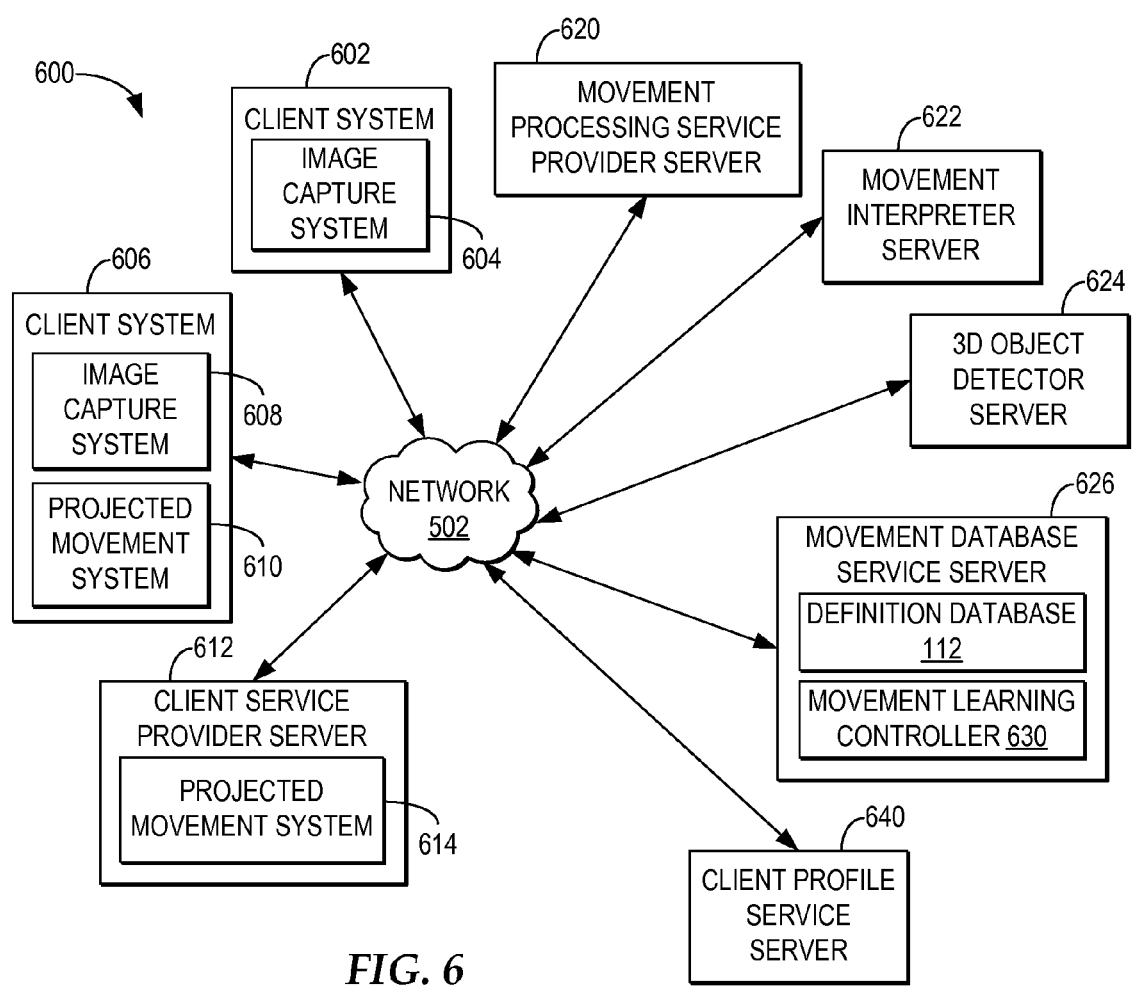
FIG. 6 is a block diagram depicting one example of a distributed network environment in which a movement-enabled projected movement method, system, and program product may be implemented.

Referring now to FIG. 6, a block diagram depicts one example of a distributed network environment in which a movement-enabled projected movement method, system, and program product may be implemented. It is important to note that distributed network environment 600 is illustrative of one type of network environment in which the movement-enabled projected movement method, system, and program product may be implemented; however, the movement-enabled projected movement method, system, and program product may be implemented in other network environments. In addition, it is important to note that the distribution of systems within distributed network environment 600 is illustrative of a distribution of systems; however, other distributions of systems within a network environment may be implemented. Further, it is important to note that, in the example, the systems depicted are representative of the types of systems and services that may be accessed or request access in implementing a movement processing system and a movement-enabled projected movement system. It will be understood that other types of systems and services and other groupings of systems and services in a network environment may implement the movement processing system and movement-enabled projected movement system.

As illustrated, multiple systems within distributed network environment 600 may be communicatively connected via network 502, which is the medium used to provide communications links between various devices and computer communicatively connected. Network 502 may include permanent connections such as wire or fiber optics cables and temporary connections made through telephone connections and wireless transmission connections, for example. Network 502 may represent both packet-switching based and telephony based networks, local area and wide area networks, public and private networks. It will be understood that FIG. 6 is representative of one example of a distributed communication network for supporting a movement processing system and movement-enabled projected movement system; however other network configurations and network components may be implemented.

The network environment depicted in FIG. 6 may implement multiple types of network architectures. In one example, the network environment may be implemented using a client/server architecture, where computing systems requesting data or processes are referred to as clients and computing systems processing data requests and processes are referred to as servers. It will be understood that a client system may perform as both a client and server and a server system may perform as both a client and a server, within a client/server architecture. In addition, it will be understood that other types of network architectures and combinations of network architectures may be implemented.

In the example, distributed network environment 600 includes a client system 602 with an image capture system 604 and a client system 606 with an image capture system 608. In one example, image capture systems 604 and 608 are stereoscopic image devices implementing one or more image capture devices, such as image capture devices 202 and 204, and may include one or more sensors, such as sensor 240. Stereoscope image capture systems 604 and 608 capture images and other data and stream the images and other data to other systems via network 502 for processing. In addition, stereoscope image capture systems 604 and 608 may include video processors for tracking object properties, such as video processor 316 and video processor 318, described with reference to FIG. 3 and a geometry processor for generating streams of 3D object properties, such as geometry processor 320, described with reference to FIG. 3.

In one example, each of client system 602 and client system 606 may stream captured image frames to one or more object detection services. In one example, an movement processing service provider server 620 provides a service that includes both an object detector service, such as 3D object detector 104, for processing streamed images and other data and an movement interpreter service, such as movement interpreter 106, for predicting types and characteristics of user movement, predicting a probability that the captured images represent the predicted type of user movement, and controlling output of the predicted movement records to one or more other systems accessible via network 502.

As to movement processing service provider server 620, different entities may implement a movement processing service and different entities may access the movement processing service. In one example, a user logged into one of client system 602 or client system 606 may subscribe to the movement processing service. In another example, an image capture system or a particular application requesting movement processing may automatically stream captured images and data to the movement processing service.

In another example, each of client system 602 and client system 606 may stream captured frames to a 3D object detector server 624. 3D object detector server 624 receives captured images and other data from image capture systems, such as image capture system 604 or image capture system 608, and processes the images and other data to generate 3D object properties of detected movements, for output to a movement interpreter system, such as movement interpreter server 622 or movement processing service provider server 620. In additional or alternate embodiments, an object detector service may be implemented within one or more other systems, with one or more other services performed within those systems. In particular, in additional or alternate embodiments, an object detector service may be implemented within a client system at which the images and other data are captured.

Each of the server systems described may be distributed across one or more systems. In addition, each of the server systems may be distributed across systems with 3D image processing power, including processors with the CellBE architecture programmed to perform efficient 3D data processing. In one example, an entity, such as a business or service provider, may implement separate server systems for object detection and movement interpretation, wherein multiple movement interpreter servers are implemented with each movement interpreter server processing different types of 3D object properties.

Movement processing service provider server 620, movement interpreter server 622, and 3D object detector server 624 may locally store a definition database, such as definition database 112, of raw images, 3D movement properties, movement definitions, and item definitions. In addition, movement processing service provider server 620, movement interpreter server 622 and 3D object detector server 624 may access a movement database service server 626 that facilitates definition database 112.

In addition, movement database service server 626 includes a movement learning controller 630. Movement learning controller 630 prompts users to provide samples of particular types of movements and prompts users to indicate whether a predicted type of movement matches the user's actual movement. In addition, movement learning controller 630 gathers other information that enables movement learning controller 630 to learn and maintain movement and item definitions in movement database 112 that when accessed by object detector services and movement interpreter services, increases the accuracy of generation of 3D object properties and accuracy of prediction of types and characteristics of user movements, from 3D object properties, by these services.

Further, movement processing service provider server 620, movement interpreter server 622, 3D object detector server 624, or movement database service server 626 may access additional context information for a user, including movement definitions specified for a particular user, previous movements predicted for the particular user, predicted movement projections for the user, and other user data from a client profile service server 640.

Movement processing service provider server 620 and movement interpreter server 622 stream predicted movement records, such as movement record 420, to movement-enabled projected movement systems via network 502. In the example embodiment, client system 606, such as a computer system implemented within an exercise environment, includes a movement-enabled projected movement system 610, enabling client system 606 to tracking changes in user physical ability over time and predicting a projected user movement.

In addition, in the example embodiment, client service provider server 612 includes a movement-enabled projected movement system 614 which is a movement-enabled service for enabling client service provider server 612, for a subscribing user, to tracking predicted movement records, track changes in user physical ability over time, and predict projected movement of the user. In particular, client service provider server 612 represents a server which provides a projected movement service to one or more subscribing client systems or subscribing users.

Figure 7:
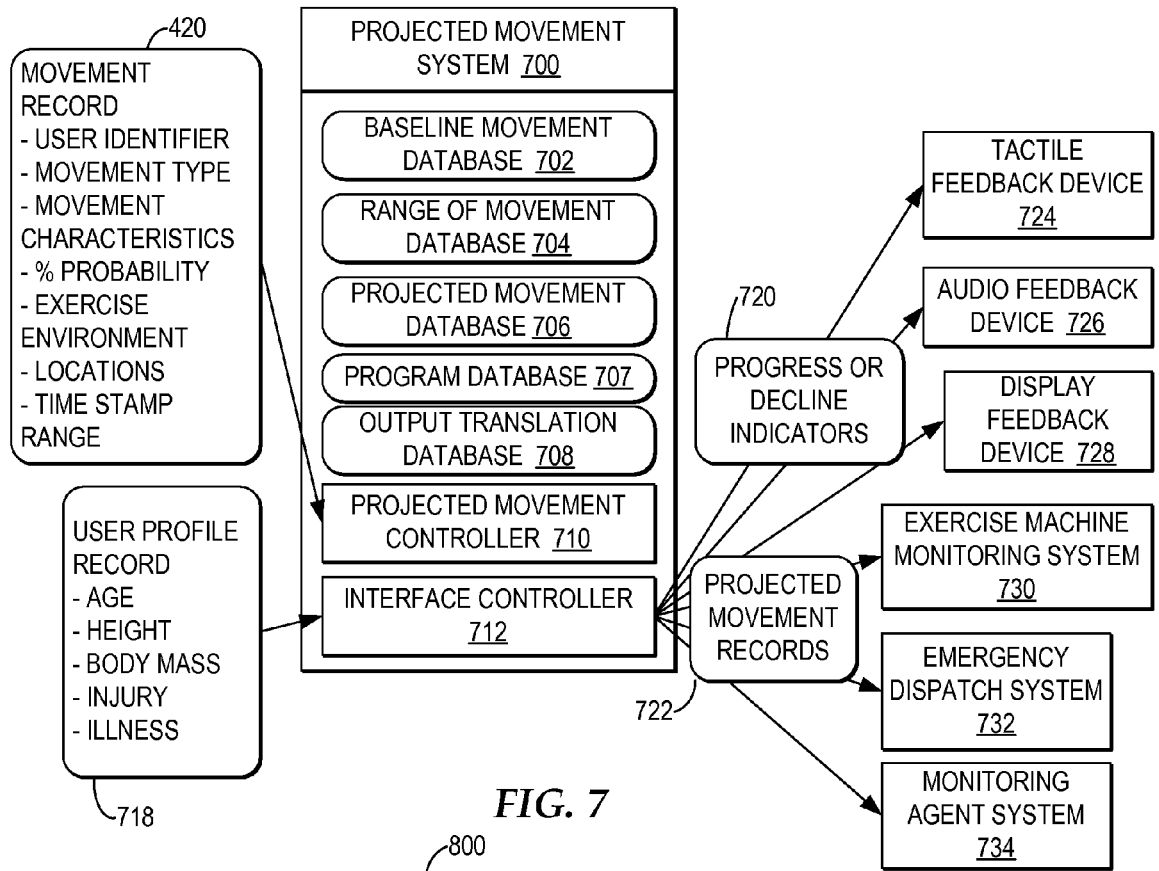
FIG. 7 is a block diagram illustrating one example of an implementation of a movement interpreter system for predicting user movements from which a movement-enabled projected movement system predicts projected movement of a user.

With reference now to FIG. 7, a block diagram illustrates one example of an implementation of a movement interpreter system for predicting user movements from which a movement-enabled projected movement system predicts projected movement of a user. Projected movement system 700 receives predicted movement records, such as predicted movement record 420, from movement processing system 100. In the example, predicted movement record 420 includes entries for a user identifier, a movement type, movement characteristics, a percentage probability that a movement type and characteristics are correctly predicted, a detected exercise environment, the changes in mapped x, y, and z coordinate locations for the identified movement type and characteristics, and a time stamp range for the coordinate locations. It will be understood that a predicted movement record may include additional or alternate types of entries.

In the embodiment, initially, an interface controller 712 of projected movement system 700 gathers predicted movement records and additional user information for a user into baseline movement database 702. In one example, projected movement controller 710 may enable an interface through which user profile information is entered or access another data storage system with user profile information. In one example, a user profile record 718 includes a current age, height, weight, diet, body mass, injury status and illness status. It will be understood that a user profile record of user profile information accessed by projected movement controller 710 may include additional or alternate types of user profile information from the entries illustrated in user profile record 718. For example, user profile information may also include exercise goals or restrictions for a user.

In one example, projected movement controller 710 may combine predicted movement records and user profile information into a movement baseline for a user in baseline movement database 702. In another example, projected movement controller 710 may combine predicted movement records and user profile information into separate movement baselines for a user sorted according to a type of exercise environment, a type of movement, or other criteria. For example, baseline movement database 702 may include a first baseline entry for an outdoor running environment and a second baseline entry for an indoor weight lifting environment. Additionally, projected movement controller 710 may include multiple entries for a same type of baseline at different time periods or may update a baseline entry over time.

In particular, a movement baseline for a user may specify, for each body part or each type of body movement, a range of motion, maximum speed, maximum strength, or other characteristics of the movement. For example, a movement baseline for a user may specify a range of motion, in degrees, that a user's neck may rotate or stretch. In another example, a movement baseline for a user may specify an amount of weight a user is enabled to lift and a number of repetitions of the lift prior to detecting any trembling in a user's muscles.

Next, projected movement controller 710 collects subsequent predicted movement records for a user and may store the subsequent predicted movement records for a user in range of movement database 704. Based on the subsequent predicted movement records, projected movement controller 710 predicts projected user movement and may store the projected movement in a projected movement database 706.

In one example, projected user movement represents a time identifier of the length of time from when a movement baseline is established to when a next predicted movement record is received. Projected user movement may also represent the projected length of time until a next predicted movement of a particular type will be detected, based on the length of time between when a movement baseline is established and when a next predicted movement record indicates a change in the particular type of movement. For example, if a user is lifting weights and the time between a user's first lift and a user's second lift is 5 seconds, but the time between the first lift and third lift is 15 seconds, projected movement controller 710 may output projected movement indicating a third lift 15 seconds after the baseline lift or projected movement controller 710 may output projected movement indicating that the time between lifts is increasing and predicting a next lift at 30 seconds from the first lift.

In another example, projected user movement represents any change in movement characteristics detected from comparing subsequent predicted movement records with the movement baseline, where changes in movement characteristics include changes in the range of motion, speed or strength of a particular type of user movement. In addition, projected user movement may represent a change in movement characteristics indicated by whether the change in movement represents progress or decline, a risk for injury, or other attribute of the change in movement characteristics In yet another example, projected user movement represents the path along which user movement has projected or a projected path along which user movement will continue. For example, projected user movement may specify the predicted strength of a user's arms, based on comparing the movement baseline of a user's strength, age, and injury, with subsequent movement records predicting movements specifying changes in the user's arm strength. In addition, in one example, projected movement controller 710 may predicted projected movement by comparing a movement baseline and subsequent predicted movement records with one or more programs specified in program database 707. In particular, each program in program database 707 may specify criteria for measuring the type of changes in user movement, may specify expected types of changes in user movement, may specify types of changes in user movement indicating progress, and may specify types of changes in user movement indicating decline. In addition, each program include different specifications based on user information, such as a user age, height, injury history, or other information collected for a baseline movement entry. A program may be specified for a particular user or group of users, for a particular type of exercise environment, or by other criteria.

In one example, a program may specify expected movement for a group of users that perform in tandem or as a team. For example, the program may specify the predicted movements of the players of a team for a particular play, including expected movements, positions, and timing such that projected movement controller 710.

In the example, based on the projected movement, interface controller 712 translates the projected movement into output signals to one or more devices or systems. In particular, interface controller 712 translates projected movement into output signals based on rules specified for output by device, by projected movement type, or other criteria, in output translation database 708.

In the example, interface controller 712 may generate an output signal indicating progress or decline, such as progress or decline indicators 720, based on projected movement, to one or more output devices, including, but not limited to, tactile feedback device 724, audio feedback device 726, and display feedback device 728. Tactile feedback device 724 provides tactile detectable output to a user or monitoring agent, audio feedback device 726 provides audible output to a user or monitoring agent, and display feedback device 728 provides displayable feedback to a user or monitoring agent.

In addition, in the example, interface controller 712 may generate an output signal of one or more projected movement records for one or more users, such as projected movement records 722, to one or more output devices, including, but not limited to, exercise machine monitoring system 730, emergency dispatch system 732, and monitoring agent system 734. Exercise machine monitoring system 730, in one example, may provide recommendations for a user to adjust movement to properly use an exercise machine, to meet goals on an exercise machine or provide other instructions or recommendations by comparing projected movement records 722 with proper movement mappings, goal mappings, or instructions for use of the machine. Emergency dispatch system 732, in one example, automates dispatch requests for providing medical assistance to a user based on receiving projected movement records indicative of an injury.

Monitoring agent system 734, as will be further described, provides projected movement records 722 and information interpreted from projected movement records, to a monitoring agent. In one example, a monitoring agent is a doctor, physical therapist, trainer, or other medical professional and the medical professional is enabled to monitor projected movements of a patient from monitoring agent system 734. In another example, a monitoring agent is a company that a user authorized to monitor user progress or decline.

It will be understood that in additional or alternate embodiments, interface controller 712 may translate projected movement and other movement records into one or more other types of output signals. In addition, it will be understood that in other embodiments, interface controller 712 may control output of projected movement to additional or alternate types of output devices or systems.

It is important to note that projected movement system 700 may control storage of predicted movement records, prediction of projected movement, and output of projected movement records and other indicators for one or more specific users or groups of users. For example, projected movement system 700 may monitor predicted movement records for multiple users exercising in tandem or as a team and predict projected movement of individual users and projected movement of the users as a whole. In one example, projected movement controller 710 may gather baseline movement entries in baseline movement database 702 for each user or the team of users from predicted movement records received during a practice. During a game, projected movement controller 710 compares the subsequent predicted movement records received during the game with the baseline movements of the team of users to determine how closely each user and the team of users tracked to movements during practice. For example, projected movement controller 710 may determine how closely the users, as a team, perform a particular play during a game by comparing subsequent predicted movement records received during the game with the baseline movement for the particular play.

Figure 8:
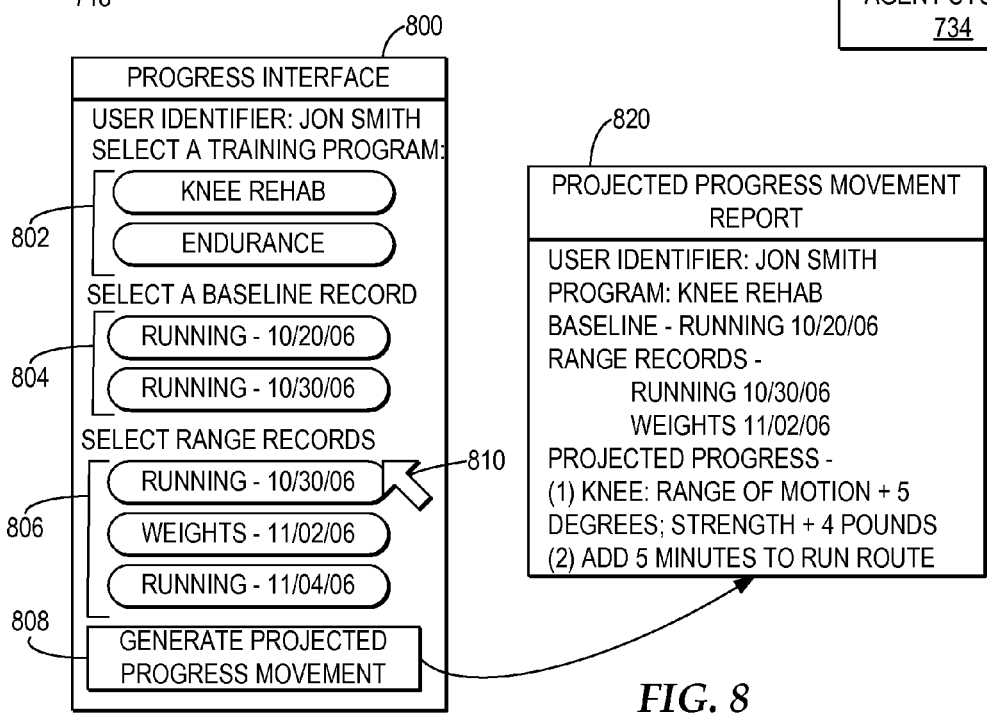
FIG. 8 is a block diagram depicting one example of providing projected movement reports to a monitoring agent system.

Referring now to FIG. 8, a block diagram illustrates one example of providing projected movement reports to a monitoring agent system. In the example, interface controller 712 enables a particular user or monitoring agent, from monitoring agent system 734, to select for the particular user, a training program, a baseline record set, and a record range of records and to receive a progress report indicated the projected movement of the particular user in view of the training program.

In the example, a progress interface 800 includes multiple selectable training program options illustrated at reference numeral 802, multiple selectable sets of movement baseline entries illustrated at reference numeral 804, and multiple selectable subsequent movement records illustrated at reference numeral 806. By positioning a cursor 810, the particular user or monitoring agent selects from the options and then selects a selectable button 808 to trigger projected movement controller 710 to generate projected movement for the particular user.

In the example, as illustrated within projected progress movement report 820 output to monitoring agent system 734, projected movement controller 710 generates projected movement for "Jon Smith", for the training program "knee rehab", with a movement baseline of the predicted movements associated with "running" on "Oct. 20, 2006", as compared with the range of subsequent predicted movement of "running" on "Oct. 30, 2006" and "weights" on "Nov. 2, 2006". In the example, based on comparing the selected movement baseline entry with the selected range records and the standards established in the selected training program, projected movement controller 710 specifies that range of motion for a knee has increased by 5 degrees and strength for the knee increased by 4 pounds, where the degree and pound measurements are detected based on standards for projecting movement in the selected training program. In addition, in the example, projected movement controller 710 specifies that projected movement includes adding 5 minutes to a running route.

Figure 9:
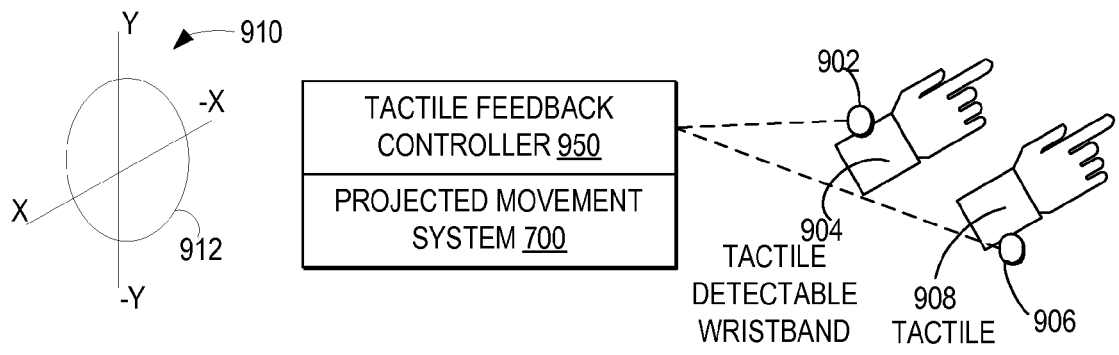
FIG. 9 is an illustrative diagram illustrating one example of tactile detectable feedback devices receiving tactile feedback from a projected movement.

Referring now to FIG. 9, an illustrative diagram illustrates one example of tactile detectable feedback devices receiving tactile feedback from a projected movement. As illustrated, a user may wear wristbands 904 and 908, which each include controllers for controlling tactile detectable outputs and hardware which can be controlled to create the tactile detectable outputs. Examples of tactile detectable outputs may include detectable pressure pulses, detectable changes in the surface of the wristbands, and other adjustments that can be sensed by the user wearing wristbands 904 and 908. In addition, tactile detectable outputs may be adjusted in frequency, intensity, duration, and other characteristics that can be sensed by the user wearing wristbands 904 and 908.

In the example, wristband 904 includes a wireless transmitter 902 and wristband 908 includes a wireless transmitter 906. Each of wireless transmitter 902 and wireless transmitter 906 communicate via a wireless network transmission to tactile feedback controller 950. Tactile feedback controller 950 receives tactile signals from projected movement system 700 and transmits signals to each of wireless transmitters 902 and 906 to direct tactile output from wristband 904 and wristband 908. Tactile feedback controller 950 and projected movement system 700 may communicate within a computer system or communicatively connect via network 502, for example.

Advantageously, by controlling output of projected movement signals to wristband 904 and wristband 908 worn by a user, only that user, and not other users competing against the user, detects the tactile output signals. In addition, advantageously, by controlling output of projected movement signals to wristband 904 and wristband 908 worn by a user, the user receives real-time feedback from projected movement system 700 as projected movement is predicted from current user movement also captured and provided as predicted movement records to projected movement system 700 in real-time.

In particular, projected movement system 700 transmits tactile signals to each of wireless transmitters 902 and 906 for controlling the pulse patterns, positions, force, durations, frequency, and timing of outputs around the circumference of each wristband. In an example illustrated at reference numeral 910, projected movement system 700 sends tactile signals for controlling a band 912 where each tactile signal includes an x and a y coordinate and force. The pattern and positions of pulses may vary in width, such as from the y position to the x position, and direction, such as rotating pulse clockwise around a wristband.

Additionally, each of wireless transmitters 902 and 906 may include sensors to monitor the relative position of each of wristbands 904 and 908 compared with the force of gravity. Referring to the example illustrated at reference numeral 910, as a user wearing band 912 rotates the user's arm, the y position for controlling tactile outputs would always remain up and the –y position would also remain down, relative to the force of gravity, such that the tactile signals are re-positioned about the depicted axis based on the current position of the user's arm.

In one example, projected movement system 700 may translate projected movement into a tactile output that uniquely indicates general projected movement indicators, such as progress or decline. In another example, projected movement system 700 may translate projected movement into a tactile output that uniquely indicates a type of movement, changes in characteristics, and other types of information with a projected movement record. In addition, projected movement system 700 may translate projected movement into tactile output that directs a user's movement.

It is important to note, that wristbands 904 and 908 are examples of one type of tactile feedback devices located in two fixed positions; in alternate embodiments, other types of tactile feedback devices may be implemented, one or more tactile devices may be implemented, and tactile devices may be detectable in one or more locations. In another example, a user may wear a tactile detectable glove which functions as a Braille device or 3D "feel" device with tactile adjustable interfaces in the fingertips of the glove.

In addition, it is important to note that similar to tactile output, projected movement system 700 may control audio outputs, such as to headphones worn by a user, that audibly inform the user of projected movement or audibly direct a user's movement. A tactile feedback controller and audio feedback controller may by integrated and enabled to select whether to send outputs to audio devices or tactile detectable devices based on a detected noise level in a current exercise environment.

With reference now to FIG. 10, a block diagram illustrates an example of projected movement system concurrently monitoring and predicting projected movement of multiple users. In the example, image capture system 1004, which may include one or more image capture devices and sensors, capture 3D image streams of movements of a user 1012 and a user 1014 within an exercise environment 1010. Image capture system 1004 passes the captured 3D image streams to movement processing system 100. Movement processing system 100 distinguishes movements by user 1012 from movements by user 1014 within the 3D object properties generated from the captured 3D image streams and generates predicted movement records for each of user 1012 and user 1014. In the example, projected movement system 700 receives predicted movement records for each of user 1012 and user 1014 and projected movement system 700 predicts projected movement for each of user 1012 and user 1014. Movement processing system 100 and projected movement system 700 may communicate within a computer system or communicatively connect via network 502, for example.

In the example, projected movement system 700 controls output of projected movement record 1032 for user 1012 and projected movement record 1034 for user 1014 to monitoring agent system 734. In one example, monitoring agent system 734 may track, in real time, the projected movement of users within a gym or other exercise environment. By tracking projected movement at monitoring agent system 734, monitoring agent system 734 may alert a trainer or other agent to aid a particular user whose movement indicates a risk for injury or improper use of equipment. In addition, monitoring agent system 734 may track, from projected movement records, users within exercise environment 1010 who are concealing or unaware of injuries based on detected movement and projected movement.

In addition, in the example, projected movement system 700 controls output of projected movement signals to output devices worn by user 1012 or user 1014. For example, projected movement system 700 controls output of a signal indicating a projected decline in strength to user 1012 through a tactile feedback signal 1030.

Figures 11, 12:
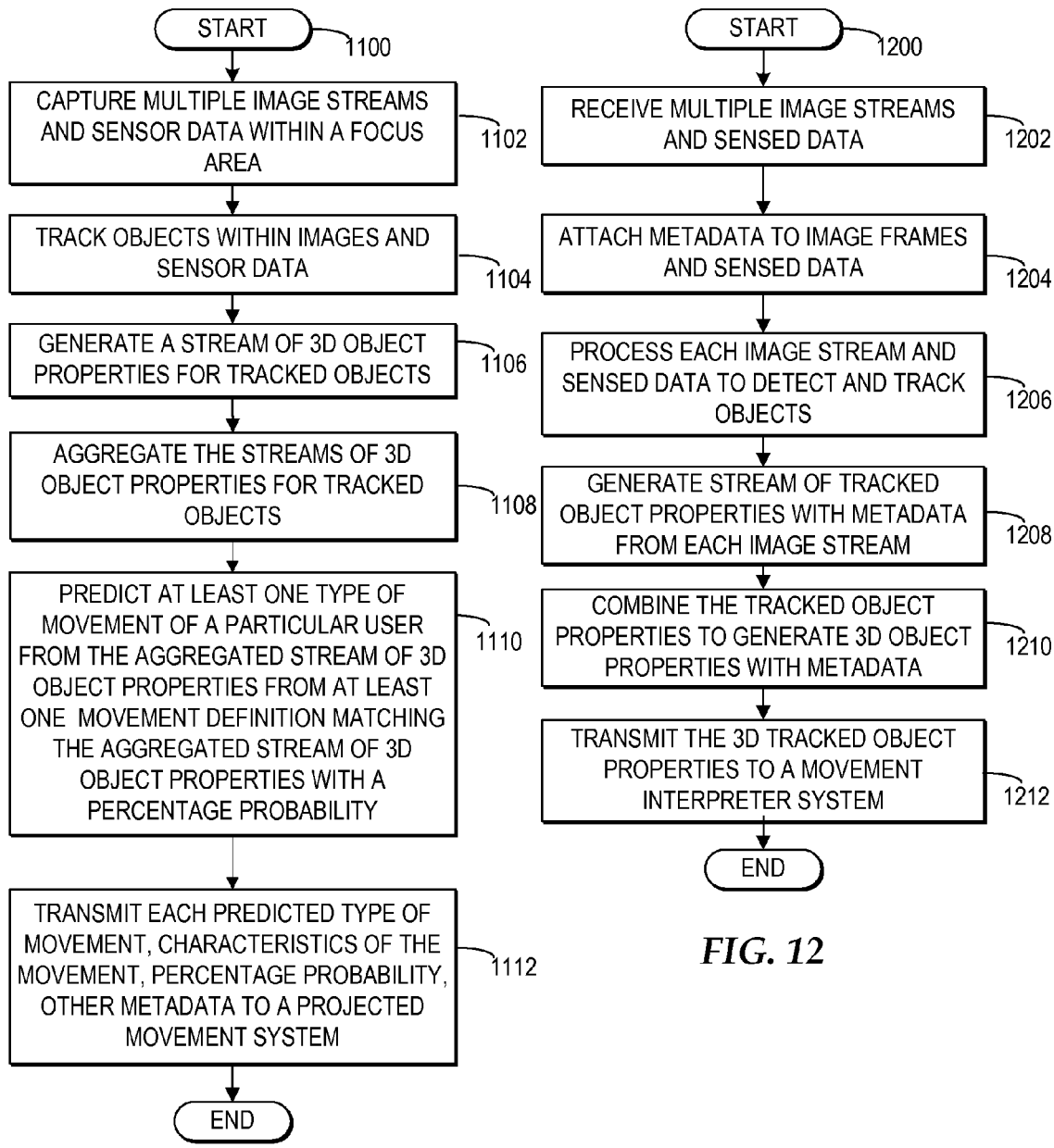
FIG. 11 is a high level logic flowchart illustrating a process and program for a movement processing system to predict movement types and characteristics with a percentage probability.
FIG. 12 is a high level logic flowchart depicting a process and program for an object detection controller detecting movement by tracking objects within image streams and other sensed data and generating 3D object properties for the tracked objects representative of movements.

Referring now to FIG. 11, a high level logic flowchart depicts a process and program for a movement processing system to predict movement types and characteristics with a percentage probability. In the example, the process starts at block 1100, and thereafter proceeds to block 1102. Block 1102 depicts capturing, via a stereoscopic image device, multiple image streams and via sensors, sensor data, within a focus area. Next, block 1104 illustrates tracking objects within the images and sensor data. Thereafter, block 1106 depicts generating a stream of 3D object properties for tracked objects. Thereafter, block 1108 depicts aggregating the 3D object properties for each of the tracked objects. In particular, the aggregated 3D object properties represent one or more objects tracked in association with at least one monitored user representative of movements of the at least one monitored user. Next, block 1110 illustrates predicting at least one type of movement of a particular user and the characteristics of the movement from the aggregated stream of 3D object properties from one or more movement definitions that match the aggregated stream of 3D object properties with a percentage probability. Thereafter, block 1112 depicts transmitting each predicted type of movement with characteristics, percentage probability, and other metadata, such as user identifier, exercise environment, tracked locations, to a projected movement system and the process ends.

With reference now to FIG. 12, a high level logic flowchart depicts a process and program for an object detection controller detecting movement by tracking objects within image streams and other sensed data and generating 3D object properties for the tracked objects representative of movements. As illustrated, the process starts at block 1200 and thereafter proceeds to block 1202. Block 1202 depicts an object detector system receiving multiple image streams, via stereoscopic image devices, and sensed data, via one or more sensors and image capture devices. Next, block 1204 illustrates the object detector system attaching metadata to the image frames and sensed data, and the process passes to block 1206. In one example, metadata includes data such as, but not limited to, a camera identifier, frame number, timestamp, and pixel count.

Block 1206 depicts the object detector system processing each image stream and sensed data to detect and track objects, wherein objects may include physical objects and user movement indicative of a movement. Next, block 1208 illustrates generating streams of tracked object properties with metadata from each image stream. Thereafter, block 1210 depicts combining the tracked object properties to generate 3D object properties with metadata. Next, block 1212 illustrates transmitting the 3D tracked object properties to a movement interpreter system, and the process ends.

Figures 13, 14:
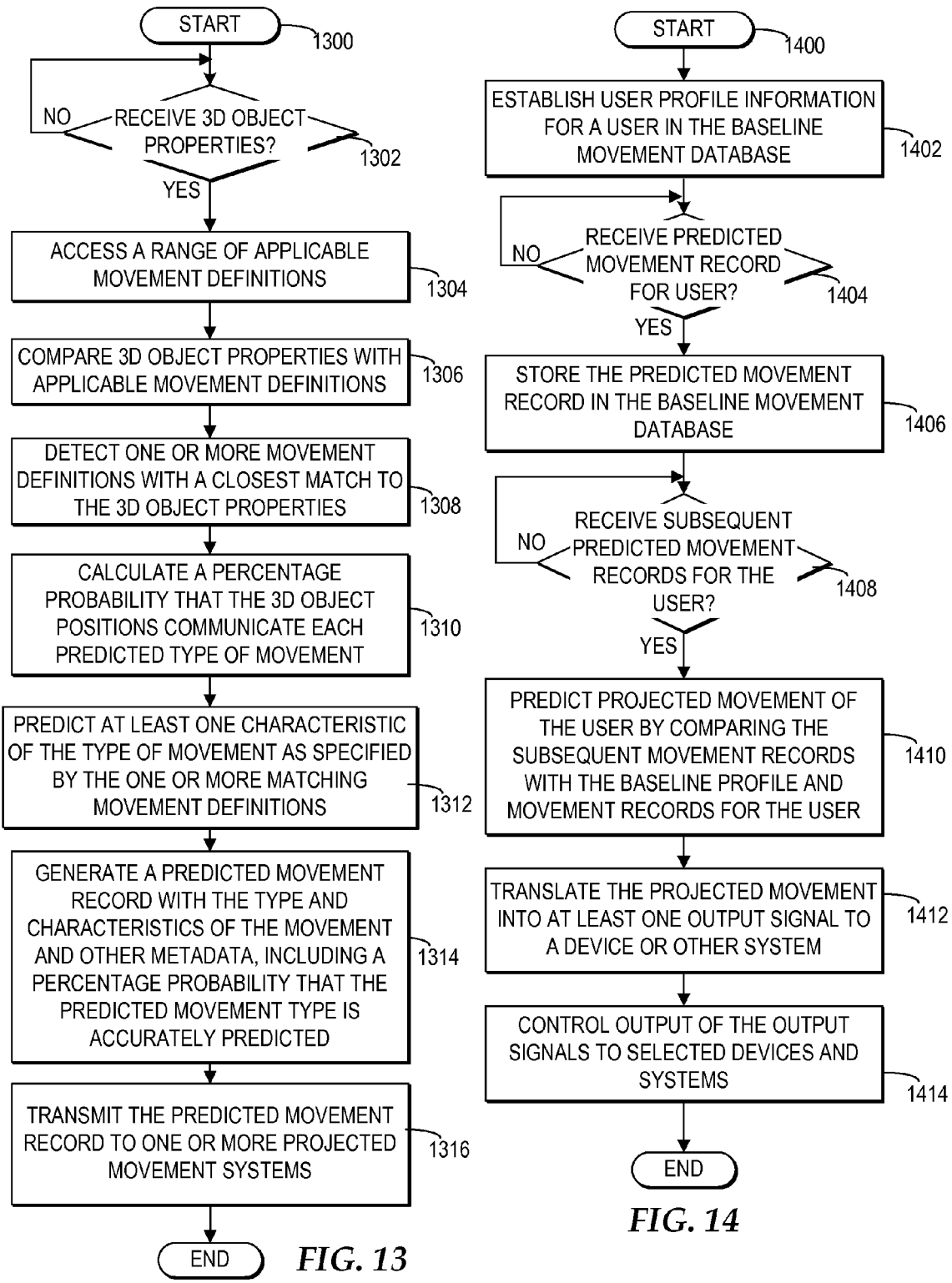
FIG. 13 is a high level logic flowchart illustrating a process and program for movement prediction from tracked 3D object properties.
FIG. 14 is a high level logic flowchart depicting a process and program for a projected movement system predicting projected movement of a user.

Referring now to FIG. 13, a high level logic flowchart depicts a process and program for movement prediction from tracked 3D object properties. In the example, the process starts at block 1300 and thereafter proceeds to block 1302. Block 1302 depicts a determination whether the movement interpreter system receives 3D object properties. When the movement interpreter system receives 3D object properties, then the process passes to block 1304. Block 1304 depicts accessing a range of applicable movement definitions, and the process passes to block 1306.

Block 1306 illustrates the movement interpreter system comparing the 3D object properties for tracked objects with the applicable movement definitions. Next, block 1308 depicts the movement interpreter system detecting at least one movement definition with a closest match to one or more sets of 3D object properties. Thereafter, block 1310 illustrates calculating a percentage probability that the 3D object properties match the predicted movement definitions. Next, block 1312 depicts predicting at least one characteristic of the type of movement as specified by the one or more matching movement definitions. Thereafter, block 1314 illustrates generating at least one predicted movement record with any predicted types of movement, percentage probability that the predicted movement is correct, characteristics of the movement, and other sensed metadata. Next, block 1316 depicts transmitting the predicted movement records to one or more projected movement systems, and the process ends.

With reference now to FIG. 14, a high level logic flowchart depicts a process and program for a projected movement system predicting projected movement of a user. As illustrated, the process starts at block 1400 and thereafter proceeds to block 1402. Block 1402 depicts establishing user profile information for a user in the baseline movement database. In one example, the projected movement system may prompt a user or monitoring agent for user profile information. In another example, the projected movement system may access user profile information from other devices and systems that acquire user profile information. Next, block 1406 depicts a determination whether the projected movement system receives a predicted movement record for a user. If the projected movement system receives a predicted movement record for the user, then the process passes to block 1406.

Block 1406 depicts storing the predicted movement record in the baseline movement database. Next, block 1408 depicts a determination whether the projected movement system receives subsequent predicted movement records for the user. When the projected movement system receives subsequent predicted movement records for the user, then the process passes to block 1410.

Block 1410 illustrates predicting projected movement of the user by comparing the subsequent movement records with the baseline profile and movement records for the user and detecting changes. In addition, the projected movement system may compare subsequent movement records and baseline profile and movement records with programs specifying model movement for a user or an exercise environment. Next, block 1412 depicts translating the projected movement into at least one output signal for a device or other system. Thereafter, block 1414 illustrates controlling output of the output signals to selected devices and systems, and the process ends.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for tracking range of body movement of a user, comprising:

capturing, using a processor, a first three-dimensional movement of a user, wherein the first three-dimensional movement is determined using at least one image capture device aimed at the body of the user;

capturing, using the processor, at least another three-dimensional movement of the user, wherein the at least one another three-dimensional movement is determined using at the at least one image capture device aimed at the body of the user;

predicting, using the processor, a movement baseline based on the first three-dimensional movement of the user;

predicting, using the processor, at least one subsequent movement range based on the at least another three-dimensional movement of the user;

predicting, using the processor, a projected movement of the user by comparing the movement baseline with the at least one subsequent movement range;

outputting, using the processor, the projected movement to at least one of an output device accessible to the user and a system accessible to a monitoring agent;

identifying, for each of the first three-dimensional movement of the user, and the at least another three-dimensional movement of the user, a separate three-dimensional object properties stream for each captured three-dimensional movement; and identifying a separate defined type of movement and at least one characteristic of the type of movement represented by each separate three-dimensional object properties stream by comparing each separately identified three-dimensional object properties stream with a plurality of movement definitions.

2. The computer-implemented method of claim 1, wherein capturing a first three-dimensional movement of the user and capturing at least another three-dimensional movement of the user further comprises capturing each separate captured three-dimensional movement using a stereoscopic image device to identify and track at least one particular type of three-dimensional movement of at least one body member the user.

3. The computer-implemented method of claim 1, wherein capturing a first three-dimensional movement of the user and capturing at least another three-dimensional movement of the user further comprises identifying in each separately captured three-dimensional movement at least one characteristic of body movement of the user comprising a fine granularity movement of at least one of a facial expression, an eye movement, a muscle contraction, and change in skin surface characteristics of the user.

4. The computer-implemented method of claim 1, wherein predicting a movement baseline based on the first three-dimensional movement of the user further comprises accessing at least one attribute of the user comprising at least one of an age, a height, a weight, a diet, a body mass, an injury, and an illness to predict the movement baseline for the user.

5. The computer-implemented method of claim 1, wherein the projected movement indicates a decline in the range of body movement of the user from the movement baseline to the at least one subsequent movement range.

6. The computer-implemented method of claim 1, wherein the projected movement specifies a future predicted range of body movement of the user.

7. The computer-implemented method of claim 1, further comprising:
  translating the projected movement into at least one output signal for output to the at least one of an output device accessible to the user and a system accessible to the monitoring agent; and
  controlling output of the at least one output signal to the at least one of the output device accessible to the user and the system accessible to the monitoring agent.

8. A system for tracking range of body movement of a user, comprising:
  a movement processing system comprising at least one processor connected to a memory and communicatively connected to a network, further comprising:
    means for capturing a first three-dimensional movement of a user, wherein the first three-dimensional movement is determined using at least one image capture device aimed at the body of the user;
    means for capturing at least another three-dimensional movement of the user, wherein the at least one another three-dimensional movement is determined using at the at least one image capture device aimed at the body of the user; and
    means for identifying, for each of the first three-dimensional movement of the user, and the at least another three-dimensional movement of the user, a separate three-dimensional object properties stream for each captured three-dimensional movement;
    means for identifying a separate defined type of movement and at least one characteristic of the type of movement represented by each separate three-dimensional object properties stream by comparing each separately identified three-dimensional object properties stream with a plurality of movement definitions; and
  a projected movement system comprising another at least one processor connected to another memory and communicatively connected to the movement processing system via the network, further comprising:
  means for predicting a movement baseline based on the first three-dimensional movement of the user;
  means for predicting at least one subsequent movement range based on the at least another three-dimensional movement of the user;
  means for predicting a projected movement of the user by comparing the movement baseline with the at least one subsequent movement range; and
  means for controlling output of the projected movement to at least one of an output device accessible to the user and a system accessible to a monitoring agent.

9. The system of claim 8, wherein the means for capturing a first three-dimensional movement of the user and capturing at least another three-dimensional movement of the user further comprises means for capturing each separate captured three-dimensional movement using a stereoscopic image device to identify and track at least one particular type of three-dimensional movement of at least one body member of the user.

10. The system of claim 8, wherein the means for capturing a first three-dimensional movement of the user and capturing at least another three-dimensional movement of the user further comprises means for identifying in each separately captured three-dimensional movement at least one characteristic of body movement of the user comprising a fine granularity movement of at least one of a facial expression, an eye movement, a muscle contraction, and change in skin surface characteristics of the user.

11. The system of claim 8, wherein the means for predicting a movement baseline based on the first three-dimensional movement of the user further comprises the means for accessing at least one attribute of the user comprising at least one of an age, a height, a weight, a diet, a body mass, an injury, and an illness to predict the movement baseline for the user.

12. The system of claim 8, wherein the projected movement indicates a decline in the range of body movement of the user from the movement baseline to the at least one subsequent movement range.

13. The system of claim 8, wherein the projected movement specifies a future predicted range of body movement of the user.

14. The system of claim 8, the projected movement system further comprising:
  means for translating the projected movement into at least one output signal for output to at least one of an output device accessible to the user and a system accessible to the monitoring agent; and
  means for controlling output of the at least one output signal to the at least one of the output device accessible to the user and the system accessible to the monitoring agent.

15. A program product comprising a non-transitory storage-type computer-usable medium including a computer-readable program for tracking range of body movement of a user, wherein the computer-readable program when executed on a computer causes the computer to:
  capture a first three-dimensional movement of a user, wherein the first three-dimensional movement is determined using at least one image capture device aimed at the body of the user;
  capture at least another three-dimensional movement of the user, wherein the at least one another three-dimensional movement is determined using at the at least one image capture device aimed at the body of the user;
  predict a movement baseline based on the first three-dimensional movement of the user;
  predict at least one subsequent movement range based on the at least another three-dimensional movement of the user;
  predict a projected movement of the user by comparing the movement baseline with the at least one subsequent movement range;
  identify, for each of the first three-dimensional movement of the user, and the at least another three-dimensional movement of the user, a separate three-dimensional object properties stream for each captured three-dimensional movement; and identify a separate defined type of movement and at least one characteristic of the type of movement represented by each separate three-dimensional object properties stream by comparing each separately identified three-dimensional object properties stream with a plurality of movement definitions.

16. The program product of claim 15, wherein said computer-readable program is transmitted over a network.

17. The program product of claim 15, wherein the computer-readable program when executed on a computer further causes the computer to capture each separate captured three-dimensional movement using a stereoscopic image device to identify and track at least one particular type of three-dimensional movement of at least one body member of the user.

* * * * *